(12) United States Patent
Greenberg

(10) Patent No.: US 10,430,756 B2
(45) Date of Patent: Oct. 1, 2019

(54) MULTI-LEVEL INVENTORY MANAGEMENT SYSTEM AND ASSOCIATED METHODS

(71) Applicant: Software Developers, LLC, Lakewood, NJ (US)

(72) Inventor: Jeremy Greenberg, Lakewood, NJ (US)

(73) Assignee: Software Developers, LLC, Lakewood, NJ (US)

( * ) Notice: Subject to any disclaimer, the term of this patent is extended or adjusted under 35 U.S.C. 154(b) by 247 days.

(21) Appl. No.: 15/416,816

(22) Filed: Jan. 26, 2017

(65) Prior Publication Data

US 2018/0211203 A1 Jul. 26, 2018

(51) Int. Cl.
*G06Q 10/08* (2012.01)
*G06Q 30/06* (2012.01)

(52) U.S. Cl.
CPC ......... *G06Q 10/087* (2013.01); *G06Q 10/083* (2013.01); *G06Q 30/0633* (2013.01)

(58) Field of Classification Search
CPC . G06Q 10/087; G06Q 30/0633; G06Q 10/083
See application file for complete search history.

(56) References Cited

U.S. PATENT DOCUMENTS

| | | |
|---|---|---|
| 6,078,900 A | 6/2000 | Ettl et al. |
| 6,341,271 B1 | 1/2002 | Salvo et al. |
| 6,622,127 B1 | 9/2003 | Klots et al. |
| 7,084,738 B2 | 8/2006 | Bastian |
| 7,249,070 B1 | 7/2007 | Burrell et al. |
| 7,289,969 B1 | 10/2007 | Ballenger et al. |
| 7,574,383 B1 | 8/2009 | Parasnis et al. |
| 7,938,324 B2 | 5/2011 | Tamarkin et al. |
| 7,942,319 B2 * | 5/2011 | Bezancon ............ G06Q 10/087 235/384 |
| 8,015,081 B1 | 9/2011 | Franco |

(Continued)

OTHER PUBLICATIONS

"Logical Data Model of Oracle Retail Data Model". Oracle Database Online Documentation, 10g Release 2. Retrieved from <https://web.archive.org/web/20150914001635/https://docs.oracle.com/cd/B19306_01/bi.102/e10084/logical.htm> on Jun. 7, 2019. 2015. (Year : 2015).*

(Continued)

*Primary Examiner* — Nathan A Mitchell
(74) *Attorney, Agent, or Firm* — Mark Malek; Paul J. Ditmyer; Widerman Malek, PL

(57) ABSTRACT

A computer-implemented method for real-time and continuous inventory management using a multi-level inventory management system comprising peripheral device(s) in data communication with some number of warehouse server(s), aggregation server(s), and sales channel server(s). A warehouse server may employ real-time physical inventory parameters received from a peripheral device to manage stock keeping unit (SKU) counts and locations as shipping orders, purchase orders, and bin transfer orders are serviced. An aggregation server may compile physical it parameters received from warehouse server(s) into available inventory used to service sales orders, reserve orders, and pre-sell orders. An aggregation server may also modify available inventory to address the status of servicing warehouses (e.g., unsellable, sellable, and dropship).

20 Claims, 15 Drawing Sheets

(56) References Cited

U.S. PATENT DOCUMENTS

| | | | |
|---|---|---|---|
| 8,065,203 B1* | 11/2011 | Chien | G06Q 10/06315 705/22 |
| 8,229,791 B2 | 7/2012 | Bradley et al. | |
| 8,364,547 B2 | 1/2013 | Metzger | |
| 8,515,835 B2 | 8/2013 | Wu et al. | |
| 8,548,879 B2 | 10/2013 | Shiner et al. | |
| 8,560,407 B2 | 10/2013 | Buonagurio et al. | |
| 8,938,396 B2 | 1/2015 | Swafford et al. | |
| 8,965,796 B1 | 2/2015 | Gala | |
| 8,972,285 B2 | 3/2015 | Soldate | |
| 9,152,987 B1 | 6/2015 | Petrich et al. | |
| 2001/0042022 A1* | 11/2001 | Kirkpatrick | G06Q 30/012 705/302 |
| 2002/0082954 A1 | 6/2002 | Dunston | |
| 2002/0154017 A1 | 10/2002 | Farner | |
| 2003/0061126 A1 | 3/2003 | Erke et al. | |
| 2004/0172344 A1 | 9/2004 | Stockwell et al. | |
| 2005/0049943 A1 | 3/2005 | Luo et al. | |
| 2005/0288989 A1* | 12/2005 | Kim | G06Q 10/087 705/7.31 |
| 2007/0174146 A1 | 7/2007 | Tamarkin et al. | |
| 2007/0299748 A1* | 12/2007 | Shorter | G06Q 10/08 705/28 |
| 2008/0010170 A1* | 1/2008 | Chan | G06Q 10/087 705/28 |
| 2008/0126164 A1 | 5/2008 | Jaeck | |
| 2008/0243646 A1* | 10/2008 | Stein | G06Q 10/087 705/28 |
| 2008/0313060 A1 | 12/2008 | Damodaran | |
| 2009/0144109 A1* | 6/2009 | Knight | G06Q 10/08 705/334 |
| 2009/0164285 A1 | 6/2009 | Hurtis et al. | |
| 2009/0164343 A1 | 6/2009 | Hurtis et al. | |
| 2011/0082774 A1* | 4/2011 | Spearman | G06Q 10/087 705/28 |
| 2011/0258014 A1 | 10/2011 | Evangelist et al. | |
| 2011/0264485 A1* | 10/2011 | Notani | G06Q 10/06 705/7.31 |
| 2012/0030070 A1 | 2/2012 | Keller et al. | |
| 2012/0233039 A1* | 9/2012 | Buonagurio | G06Q 10/087 705/28 |
| 2013/0297462 A1 | 11/2013 | Ottley | |
| 2014/0114814 A1 | 4/2014 | Lindau et al. | |
| 2014/0236778 A1 | 8/2014 | Villardito | |
| 2014/0279294 A1 | 9/2014 | Field-Darragh et al. | |
| 2014/0304123 A1* | 10/2014 | Schwartz | G06Q 10/087 705/28 |
| 2015/0032502 A1 | 1/2015 | Green et al. | |
| 2015/0066570 A1* | 3/2015 | Hellen | G06Q 10/06315 705/7.25 |
| 2015/0120367 A1 | 4/2015 | Agrawal et al. | |
| 2015/0178671 A1 | 6/2015 | Jones et al. | |
| 2017/0086084 A1* | 3/2017 | Jarvis | H04W 24/06 |
| 2018/0204172 A1* | 7/2018 | Sabuz | G06Q 10/087 |

OTHER PUBLICATIONS

Xun Wang & Fotios Petropoulos (2016) To select or to combine? The inventory performance of model and expert forecasts, International Journal of Production Research, 54:17, 5271-5282, DOI: 10.1080/00207543.2016.1167983 (Year: 2016).*

Tim J. van Kampen, Renzo Akkerman, Dirk Pieter van Donk, (2012) "SKU classification: a literature review and conceptual framework", International Journal of Operations & Production Management, vol. 32 Issue: 7, pp. 850-876, https://doi.org/10.1108/01443571211250112 (Year: 2012).*

* cited by examiner

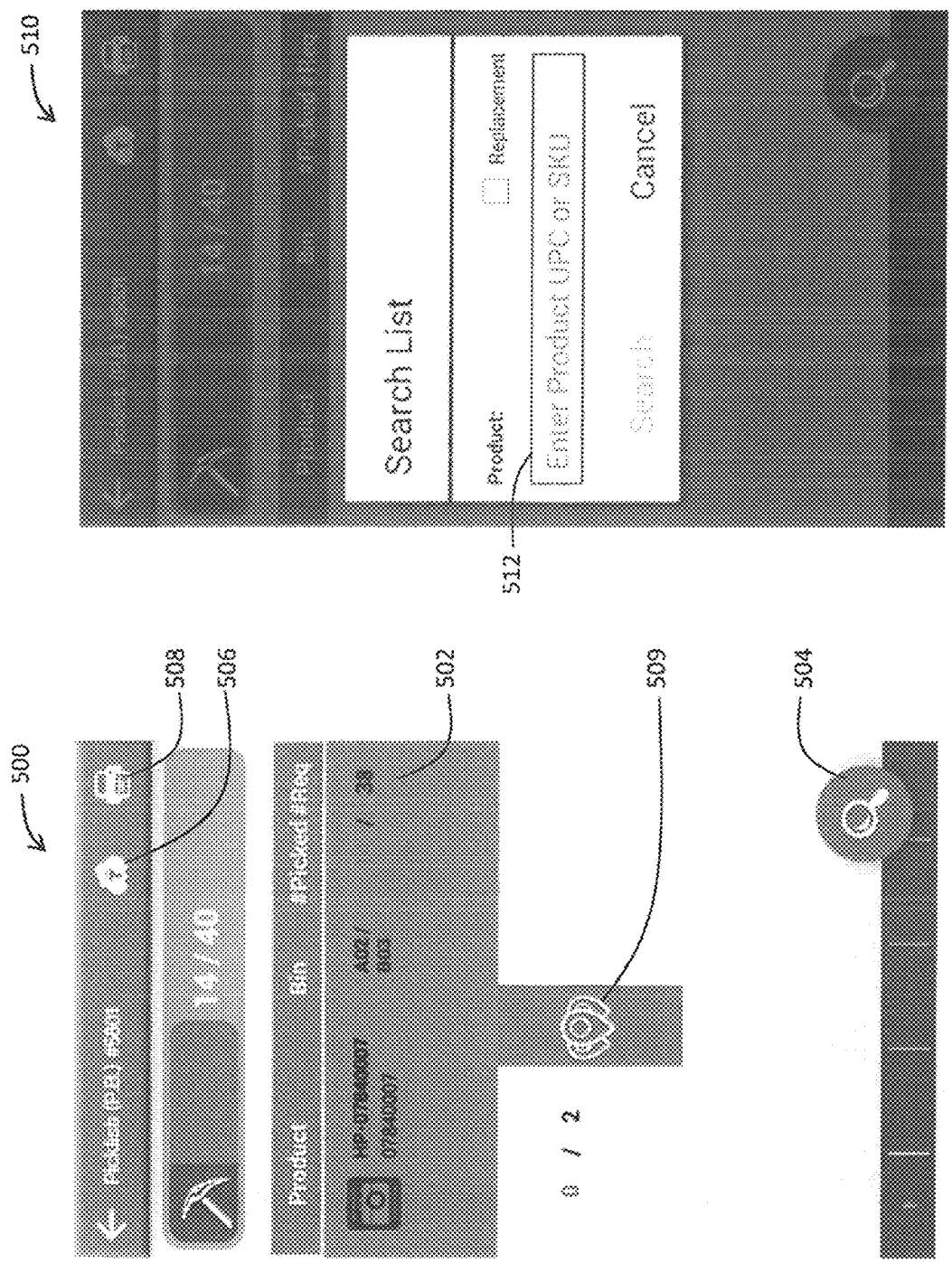

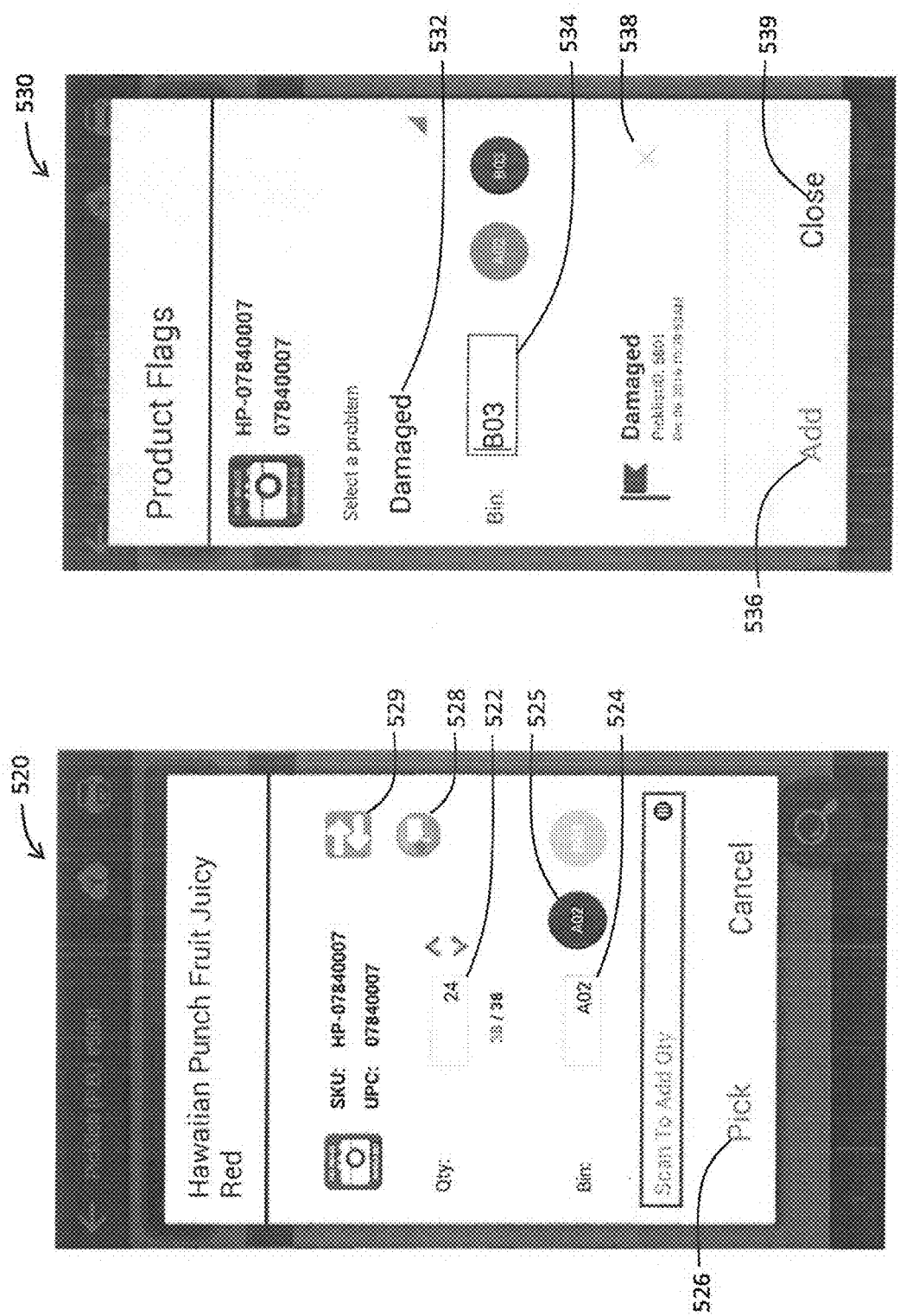

MULTI-LEVEL INVENTORY MANAGEMENT SYSTEM AND ASSOCIATED METHODS

FIELD OF THE INVENTION

The present invention relates to the field of inventory management and, more specifically, to systems and methods for multi-level management of product inventory for online retailers.

BACKGROUND

An online retail typically offers products for sale around the lock, with no down time, Remaining open for business 24 hours per day, 7 days per week, makes it difficult for a retailer to perform a physical inventory count because product quantities are constantly in flux. Unlike a brick and mortar store that is able to perform an inventory count when the store is closed, and online retailer needs a way to take inventor at any time and to keep interrelated business actions involving that inventory synchronized.

Existing inventory management solutions typically require integration between a physical inventory control system and a dynamic order management system. Such a division of roles poses a number of disadvantages, such as limiting the inventory available for sale due to allocated inventory and also being unable to count physical inventory without halting business. Online retail business need an automatic means of tracking both physical inventory and available inventory and keeping these synchronized constantly. Typically, existing warehouse solutions only track inventory on a physical level, and do not account for pending orders that make inventory that is on hand nonetheless unavailable for sale. Such implementations often force the retailer to allocate dedicated inventory for individual sales channels to prevent overselling.

In attempts to address some of the shortcomings described above, certain advances in the inventory management industry have been made, including the following:

U.S. Patent Publication No. 2009/0164343 by Hurtis et al. discloses building an order in response to a sale, similar to what is described hereinbelow as picking an order. However, the allocation of parts to build a specific order is not disclosed, nor is tracking how much inventory is available for sale in aggregate and how much is physically in a servicing warehouse. Inventory is reserved for incoming orders, but not specifically allocated for a given order. Instead, the disclosed implementation merely reserves that inventory to adjust the available inventory for sale.

U.S. Patent Publication No. 2014/0279294 by Field-Darragh et al. relates to the distribution of an order from a retail environment to a fulfillment center with a centralized warehouse system. However, this disclosure is silent on tracking the actual quantities physically in each place while maintaining an available aggregate quantity. Nor does the disclosed implementation relate to specific bin locations within the warehouse.

U.S. Patent Publication No. 2007/0174146 by Tamarkin et al. discloses inventory organized in a tree structure so that inventory at the smallest bin level gets summed up to determine the physical inventory in the bigger storage area (e.g., warehouse level). More specifically, inventory allocations must be made at the bottom of the tree on the bin level. However, the disclosure is silent on, for example, reserving inventory on the warehouse level for pending orders and having the aggregate available inventory adjusted without any physical change or allocation on the bin level.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to an inventory management system and methodology that advantageously tracks and manipulates inventoried quantities on multiple levels, including aggregate available quantity as well as warehoused physical units. The invention may comprise a system and associated computer-implemented methods for real-time and continuous inventory management using a multi-level inventory management system comprising a peripheral device(s), a Warehouse Server(s), an Aggregation Server(s), and a Sales Channel Server(s). Each of these components, whether hosted together or separately, may be characterized by one or more computer processors and by one or more non-transitory computer-readable storage media each comprising a plurality of instructions.

The Warehouse Server may create and manipulate bin-level records each comprising a bin-level inventory (i.e., physical count of bin-level SKUs), and also may create and manipulate warehouse-level records each comprising a warehouse-level inventory (i.e. physical count of warehouse-level SKUs, each of which references some bin-level SKU). The Aggregation Server may create and manipulate aggregate-level records each comprising an aggregate-level inventory (I.e., available count of aggregate-level SKUs, each of which references some warehouse-level SKU).

The Aggregation Server may receive from the Sales Channel Server a sales order associated with an aggregate-level SKU and comprising a reserve order quantity, and may decrement the aggregate-level inventory based on the reserve order quantity. The Aggregation Server may similarly manipulate the aggregate-level inventory based on receipt of a reserve order. The Aggregation Server also may receive a pre-sell order associated with the aggregate-level SKU and comprising a pre-sell order quantity, and may increment the aggregate-level inventory by the pre-sell order quantity of the pre-sold item.

The Warehouse Server may receive from the peripheral device a shipping order associated with the bin-level SKU and comprising a shipping order quantity, and may decrement by the shipping order quantity each of the reserve order quantity, the bin-level inventory, and the warehouse-level inventory associated with the bin-level SKU of the shipped item. The Warehouse Server also may receive a purchase order associated with the bin-level SKU and comprising a purchase order quantity, and may increment by the purchase order quantity both the bin-level inventory and the warehouse-level inventory of associated with the bin-level SKU of the purchased item. The Warehouse Server also may receive from the peripheral device a bin transfer order associated with the bin-level SKU of a bin-level record and comprising a bin transfer order quantity, and may decrement the bin-level inventory of the bin-level record by the bin transfer order quantity.

The Aggregation Server may receive an unsellable marking associated with a warehouse-level record, and may decrement the aggregate-level inventory by the warehouse-level inventory of the warehouse-level record marked unsellable. Conversely, the Aggregation Server may receive a sellable marking associated with a warehouse-level record, and may increment the aggregate-level inventory by the warehouse-level inventory of each of the warehouse-level records marked sellable. The Aggregation Server also may receive dropship markings associated with some number of warehouse-level records, and may increment the aggregate-level inventory by the respective warehouse-level inventory of each of the warehouse-level records marked dropship.

BRIEF DESCRIPTION OF THE DRAWINGS

FIGS. 5A, 5B, 5C, 5D, 5E, 5F, 5G, 5H, and 5J are schematic representations of states of an exemplary user interface for picklist processing using a multi-level IMS according to an embodiment of the present invention.

DETAILED DESCRIPTION OF THE INVENTION

Figure 1:
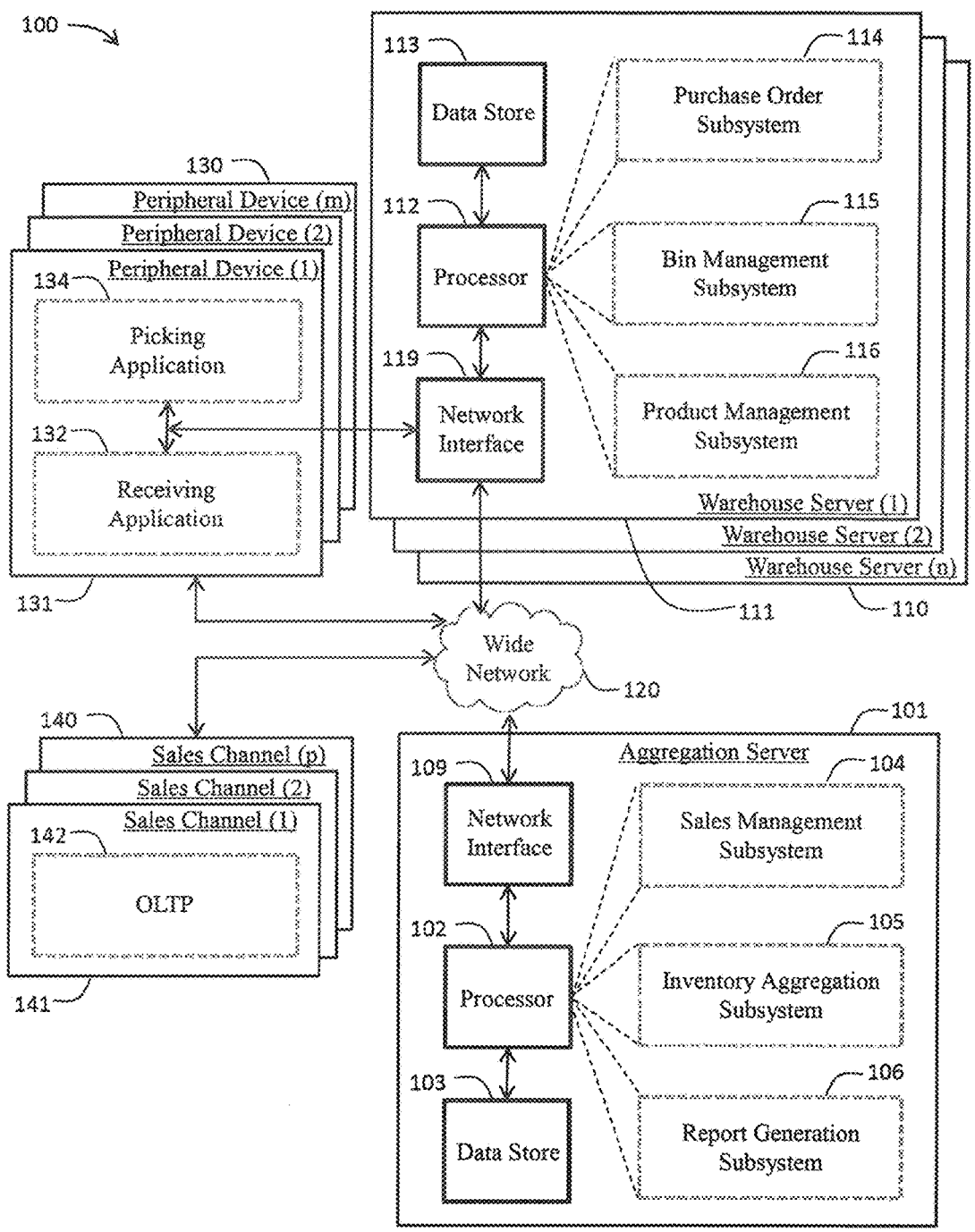
FIG. 1 is a schematic block diagram of a multi-level inventory management system (IMS) according to an embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Referring to FIGS. 1-7, a multi-level inventory management system (IMS) according to an embodiment of the present invention is now described in detail. Throughout this disclosure, the present invention may be referred to as a multi-level inventory management system, an inventory system, a management system, a real-time inventory system, an inventory aggregation system, an aggregation system, an aggregator, a device, a system, a product, a service, and a method. Those skilled in the art will appreciate that this terminology is only illustrative and does not affect the scope of the invention. For instance the present invention may just as easily relate to service provisioning technology.

An embodiment of the invention, as shown and described by the various figures and accompanying text, provides a system and associated software for multi-level inventory tracking. More specifically, in one embodiment, the present invention may comprise a real-time inventory management system that tracks inventory on a bin level, allowing multiple bin locations for a product within the same warehouse. Employing this system, when the quantity of a product in a specific bin is updated, the system may adjust the physical inventory on the bin level, the warehouse level, and the aggregate level.

As a matter of definition, a physical inventory may be defined as a quantity of a product in a given warehouse, calculated as the sum of the respective counts of the product in each individual bin of that warehouse. When a business takes an inventory, product may be counted as the quantity on hand of each stock keeping unit (SKU), which defines a distinct type of item for sale and all attributes associated with the item type that distinguish the sale item from other item types. For a product, these attributes could include, but are not limited to, manufacturer, description, material, size, color, packaging, and warranty terms.

Unlike typical warehouse management software systems, which are geared towards tracking only physical inventory in a warehouse, and typical retail inventory software systems, which track available inventory available for sale, the present invention may operate to synchronize available aggregate inventory with the physical unit counts. As a matter of definition, an aggregate inventory (also referred to herein as available inventory) may be defined as a quantity of a product across one or more servicing warehouses, calculated as the sum of the respective counts of the product in each servicing warehouse.

The present invention may advantageously allow a merchant (described elsewhere herein as a retailer) to track physical inventory accurately while maintaining separate counts for available inventory (for example, a product unit present in physical inventory may be reserved in satisfaction of a sales order or otherwise unavailable for sale). By employing the present system, the merchant may make a limited amount of inventory available across multiple sales channels, thereby maximizing sales opportunities while limiting the risk of overselling.

Advantageously for online retailers, the present invention may update the quantity of a product in a specific bin, thereby adjusting the physical inventory not only at a bin level, but also at a warehouse level and aggregate level. The system may also take into account reserved inventory for pending orders so that the available aggregate quantity may be updated as well.

More specifically, in one embodiment, the invention may comprise a system and computer-implemented method of tracking both physical inventory and available inventory on both a micro- and macro-level. For example, and without limitation, the automated system may comprise a mobile app that may be used in a warehouse to direct any movement of inventory in or out of a bin location. The system also may include a server side component that may pull inventory from various sources (e.g., servicing warehouses) to account for reserving quantity for pending sales orders. The system also may include another component that may track inbound inventory into a bin from received purchase orders and also outbound inventory from shipped orders. These components may cooperate to track and manage inventory on a bin level. At the same time, the system may automatically calculate the warehouse product quantity (physical inventory) and an aggregate quantity among all servicing warehouses (available inventory).

Referring now to FIG. 1, for example, and without limitation, a Multi-Level Inventory Management System 100, according to an embodiment of the present invention, may include an Aggregation Server 101, which may be in data communication with at least one Warehouse Server 110. Each Warehouse Server 110 may be in data communication with at least one Peripheral Device 130. The Aggregation Server 101 also may be in data communication with at least one Sales Channel System 140. Two or more of each of the Peripheral Device(s) 130, the Warehouse Server(s) 110, the Sales Channel system(s) 140 and the Aggregation Server 101 may be coupled using a network connection to a wide area network 120, such as the Internet. A Peripheral Device 130 also may be configured in direct data communication to the Warehouse Server 111 as described below in more detail.

As a matter of definition, a sales channel may be defined as a means of bringing products and/or services to market so that they may be purchased by consumers. A single business may offer to sell its products and/or services through multiple sales channels. For example, and without limitation, a business may sell its products through a direct sales channel, such as the business's own website. Also for example, and without limitation, a business may sell its products through an indirect sales channel, such as a dealer or online retailer (e.g., Amazon.com® website).

Each of the Sales Channel System(s) 140 may comprise a web host that is operable for online transaction processing (OLTP) 142. For example, and without limitation, services typically provided by the Sales Channel System(s) 140 may include virtual storefronts, online marketplaces, and secure business transactions. Such services may manipulate content required to complete commercial transactions conducted electronically on the Internet (e.g., e-commerce websites). For example, and without limitation, each Sales Channel System 140 may allow consumers to generate sales orders for products to be reserved and distributed using one or more of the Warehouse Servers 110, the coordination of which may be accomplished using the Aggregation Server 101.

For example, and without limitation, any one 111 of the Warehouse Servers 110 may comprise a processor 112 that may be operable to accept and execute computerized instructions, and also a data store 113 which may store data and instructions used by the processor 112. More specifically, the processor 112 may be positioned in data communication with some number of Aggregation Servers 101 and also with some number of Peripheral Devices 130. The processor 112 may be operable to direct input from other components of the Multi-Level IMS 100 to the data store 113 for storage and subsequent retrieval. For example, and without limitation, the processor 112 may be in data communication with external computing resources, such as the Peripheral Device 130 and the Aggregation Server 101, through a respective direct connection and/or through a network connection to the wide area network 120 facilitated by a network interface 119.

Purchase Order Subsystem 114 instructions, Bin Management Subsystem 115 instructions, and Product Management Subsystem 116 instructions may be stored in the data store 113 and retrieved by the processor 112 for execution. The Purchase Order Subsystem 114 may be operable to advantageously receive and process purchase order data submitted from a Peripheral Device 130 by a requesting party (e.g., user) who is tasked with replenishing product in a merchant's warehouse. The Bin Management Subsystem 115 may be operable to advantageously facilitate product being assigned to and/or transferred among available bins in a merchant's warehouse. The Product Management Subsystem 116 may be operable to advantageously track the location and status of product units while they are present in a merchant's warehouse.

Continuing to refer to FIG. 1, the Aggregation Server 101 may comprise a processor 102 that may be operable to accept and execute computerized instructions, and also a data store 103 which may store data and instructions used by the processor 102. More specifically, the processor 102 may be positioned in data communication with some number of Warehouse Servers 111 which, in turn, may be positioned in data communication with some number of Peripheral Devices 130. The processor 102 may be configured to direct input from other components of the Multi-Level IMS 100 to the data store 103 for storage and subsequent retrieval. For example, and without limitation, the processor 102 may be in data communication with external computing resources, such as the Warehouse Server(s) 110 and the Sales Channel System(s) 140, through a direct connection and/or through a network connection to the wide area network 120 facilitated by a network interface 109.

Sales Management Subsystem 104 instructions, Inventory Aggregation Subsystem 105 instructions, and Report Generation Subsystem 106 instructions may be stored in the data store 103 and retrieved by the processor 102 for execution. The Sales Management Subsystem 104 may be operable to organize and service requests for sales order fulfillment received from some number of Sales Channels 140. The Inventory Aggregation Subsystem 185 may be operable to employ multi-level views of physical inventory across multiple servicing warehouses to present available inventory to any number of Sales Channels in continuously and in real-time. The Report Generation Subsystem 106 may be operable to format and display sales, warehouse, and inventory metrics, as well as system-health indicators.

The Peripheral Device 130 may comprise a floor-use inventory tracking device 131 which, for example, and without limitation, may be implemented as one or more apps configured for execution on a smartphone. The inventory tracking device 131 may employ a Receiving Application 132 operable to log and manage incoming product resulting from a purchase order. The Receiving Application 132 may operate in cooperation with the Purchase Order Subsystem 114 of the Warehouse Server 111. Also for example, and without limitation, the inventory tracking device 131 may employ a Picking Application 134 operable to log and manage movement (including shipment) of product on hand at a servicing warehouse. The Picking Application 134 may operate in cooperation with the Bin Management Subsystem 114 and/or the Product Management Subsystem 116 of the Warehouse Server 111.

A user of the inventory tracking device 131 may be a warehouse team member responsible for picking, packing, shipping and stocking functions in a product warehouse. The warehouse team member may interact with various servers included in the Multi-Level IMS 100 through the Peripheral Device 130. For example, and without limitation, any person generally responsible for picking and packing orders using one or more of label picking, ring scanners, voice directed picking, and paper picket tickets may be a user of the system 100.

Those skilled in the art will appreciate that the present invention contemplates the use of computer instructions and/or systems configurations that may perform any or all of the operations involved in inventory management, including product reorder processing, role-based authentication services, vendor/customer information collection and storage, product stock updating, product movement tracking, and recent sales synchronization. The disclosure of computer instructions that include Purchase Order Subsystem 114 instructions, Bin Management Subsystem 115 instructions, Product Management Subsystem 116 instructions, Sales Management Subsystem 104 instructions, Inventory Aggregation Subsystem 105 instructions, and Report Generation Subsystem 106 instructions is not meant to be limiting in any way. Also, the disclosure of systems configurations that include Aggregation Server(s) 101, Warehouse Server(s) 110, Peripheral Device(s) 130, and Sales Channel System(s) 140 is not meant to be limiting in any way. Those skilled in the art will readily appreciate that stored computer instructions and/or systems configurations may be configured in any way while still accomplishing the many goals, features and advantages according to the present invention.

Continuing to refer to FIG. 1, the system 100 may create and maintain a bin-level record for each product stored in a bin, and also a warehouse-level record to track the status of the product in each servicing warehouse. The system 100 also may create and maintain a general record for each product to track the aggregate quantities (i.e, aggregate-level). For example, and without limitation, aggregate-level records may be stored to and retrieved from the data store 103 of the Aggregation Server 101. Also for example, and without limitation, warehouse-level and/or bin-level records may be stored to and retrieved from the data store 113 of the Warehouse Server 111. These three record types may be interlinked so that, as the bin-level record gets updated to a new quantity, the revision may tickle up and update the higher levels, specifically the warehouse-level and aggregate-level records. As new sales orders are created, the system 100 may automatically reserve from available inventory, thereby impacting on the aggregate-level and the warehouse-level. As orders get picked from the bin and shipped out, the physical inventory movement transaction may impact on the inventory tracking of all three levels.

As described above, using the present invention, inventory may be tracked on a bin level, allowing multiple bin locations for a product within the same warehouse. In this manner, inventory from multiple warehouses may be considered to calculate an aggregate inventory. As a result, as retail purchases are placed through various sales channels, inventory may be reserved on a warehouse level, effectively lowering the available aggregate inventory. At the same time, the physical inventory may be maintained at the warehouse until the sold product unit ships.

Figure 2A:
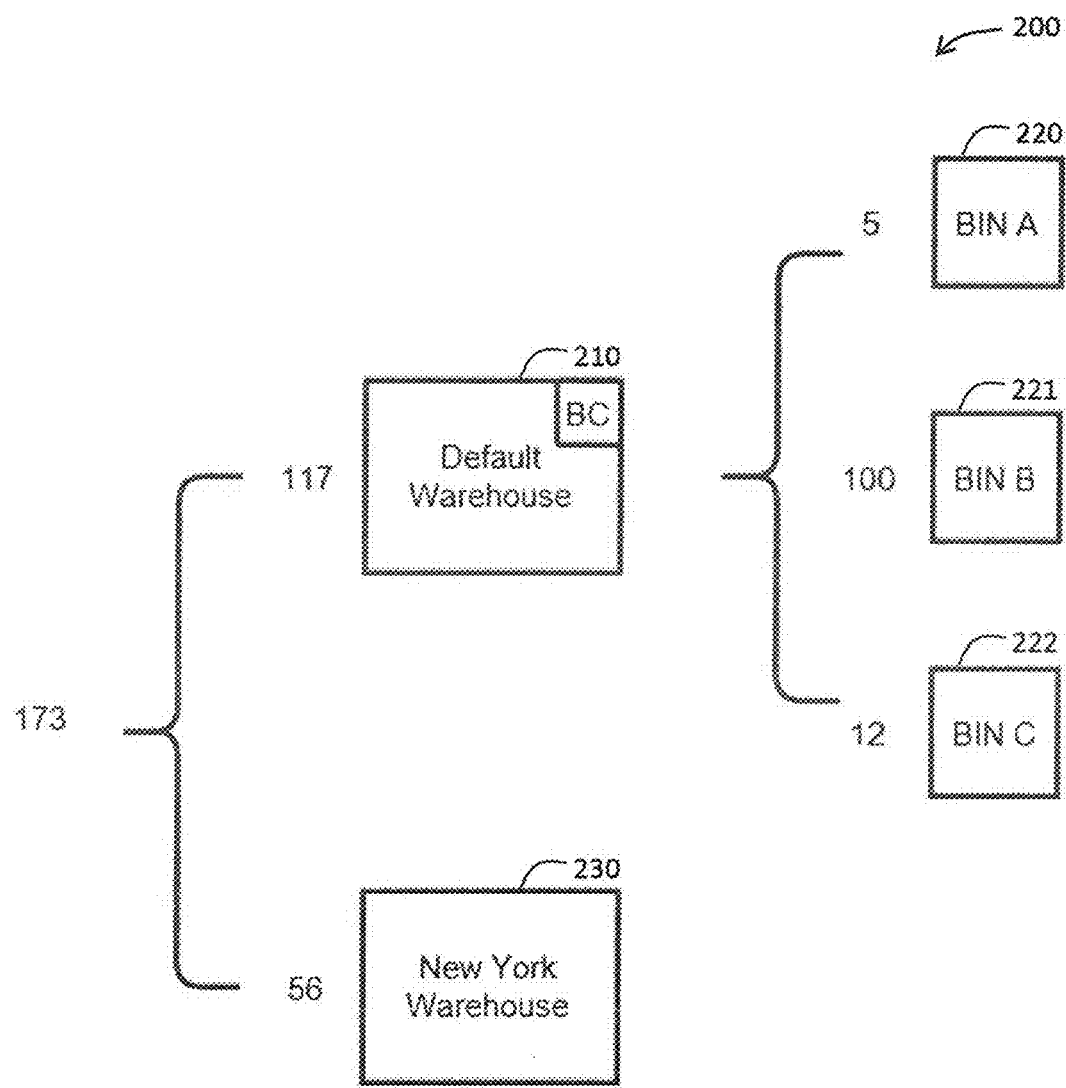
FIGS. 2A and 2B are illustrations of exemplary inventory abstractions maintained and used by the multi-level IMS depicted in FIG.

To demonstrate the above-described concept, FIG. 2A illustrates a first warehouse 210 (referred to as a Default Warehouse) comprising three bins 220, 221, and 222 (as shown, Bins A, B, and C, respectively). As a matter of definition, sales orders may, by default, reserve inventory from the Default Warehouse. The illustrated scenario 200 shows a physical inventory of 117 product units in the Default Warehouse 210 (more specifically, 5 units in BIN A (220), 100 units in BIN B (221), and 12 units in BIN C (222)). FIG. 2A further shows an aggregate quantity of 173 product units available from the Default Warehouse 210 and from a second servicing warehouse 230 (referred to as a New York warehouse), collectively, to satisfy orders processed through the Aggregation Server 101.

For each of multiple servicing warehouses the Aggregation Server 101 may track which warehouses are marked 'sellable' and which warehouses are marked 'unsellable.' As a matter of definition, marking a warehouse as Sellable may signify that all inventory in that warehouse may be sold, provided that the individual product's selling criteria are met. Also as a matter of definition, marking a warehouse as Unsellable may signify that all inventory in that warehouse will not be included in the available inventor for that product. However, an Unsellable warehouse's inventory may be included, in the total physical inventory count for the product. Note: If a default warehouse is marked as unsellable, the reserve resulting from a sales order may not be included in the available inventory calculation, which may lead to overselling.

Figure 2B:
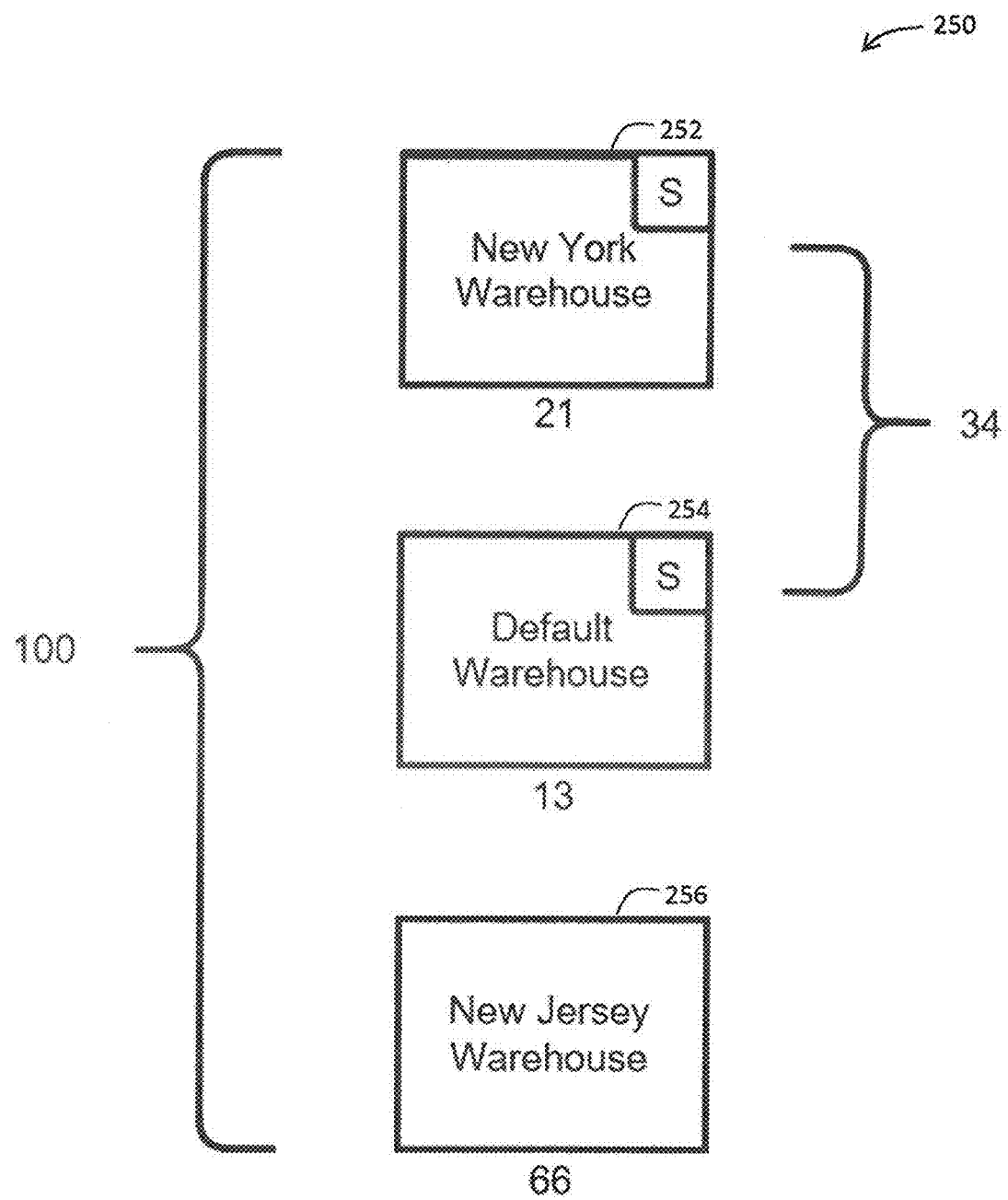

For example, and without limitation, FIG. 2 illustrates that the aggregate sellable quantity 34 is the sum of the sellable warehouses, computed as a sum of the 21 physical units at sellable New York warehouse 252 and the 13 physical units at the sellable Default Warehouse 254. A total aggregate of all warehouses (100), computed as the New York and Default warehouses' totals 252, 254 plus the 66 physical units at a New Jersey warehouse 256. Such calculation quickly provides a total number of units owned by the merchant.

In one embodiment, the system 100 may support a first sales channel (e.g., a business's direct sales website where an ad listing for a product of a given type is marketed) and also a second sales channel (e.g., an indirect sales website where multiple ad listings for the product type are marketed). Orders originating from various sales channels (in this example, the first and second sales channels) are constantly imported using the Aggregation Server 101. The Aggregation Server 101 may operate to constantly update all of the supported sales channels, making product ads active or inactive based on availability of the target product.

In the manner described above, rather than force the retailer to allocate dedicated inventory for each sales channel to prevent overselling, the present method may allow inventory to be pooled together and shared between sales channels. While the present tracking methodology is rooted in physical inventory quantities, the available inventory may consider incoming sales as they happen and adjust accordingly.

Figure 3:
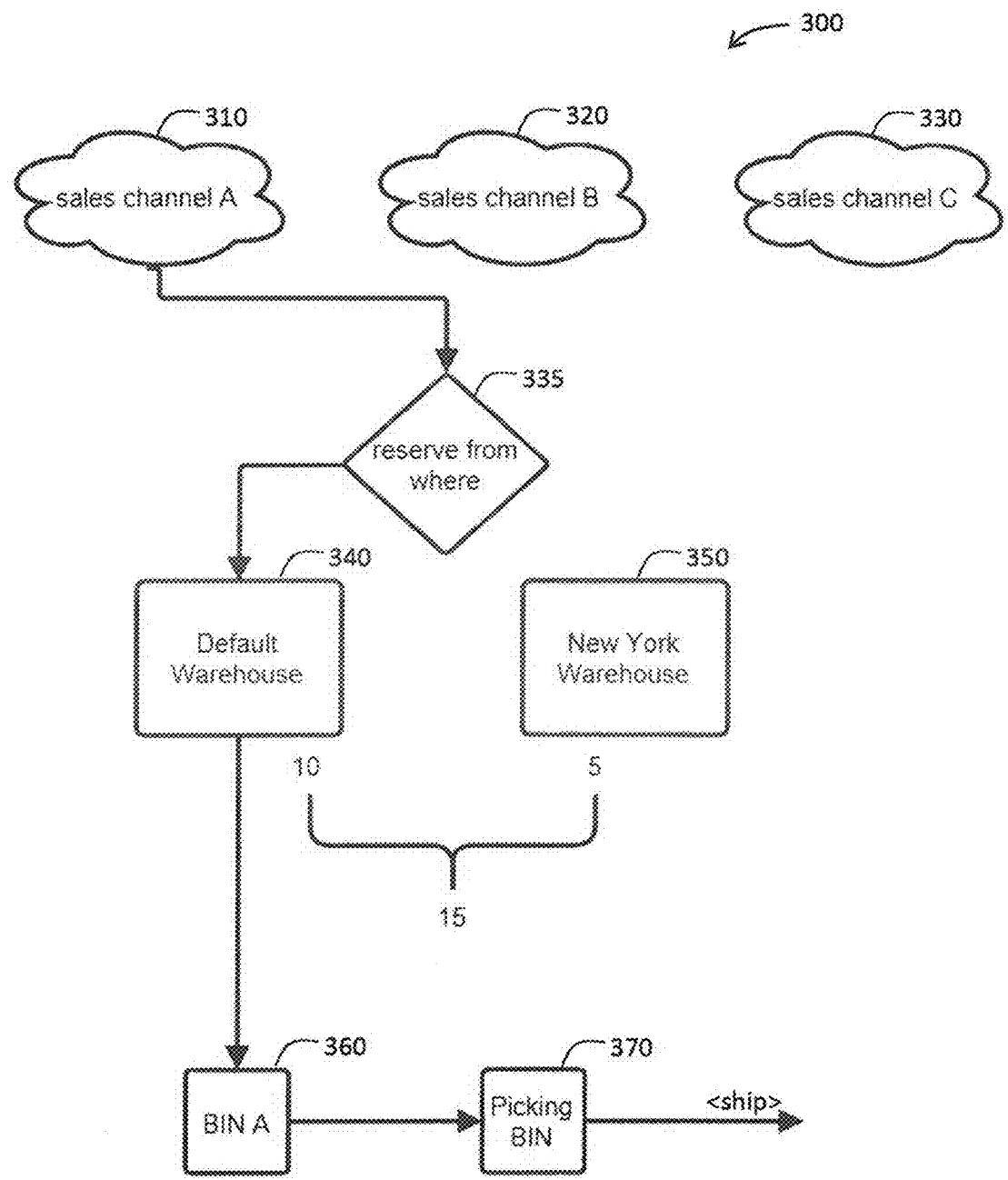
FIG. 3 is a flow chart detailing an exemplary sales order lifecycle used in connection with a multi-level IMS according to an embodiment of the present invention.

Referring now to FIG. 3, for example, and without limitation, available inventory through the Default Warehouse 340 and the New York Warehouse 350 is shown as 15. Should a sales order for a single unit come in through sales channel A 310, the system 100 may reserve a unit for that sale, bringing the available quantity on all sales channels 310, 320, 330 to 14 (that is, decrement 1 quantity from incoming order). Because the system 100 may reserve inventory for an order that has not been physically completed, the system 100 may reserve one unit from available inventory immediately and physical inventory need not be allocated to specific sales channels. As illustrated in FIG. 3, the incoming order from sales channel A 310 is designated to be reserved 335 from the Default Warehouse 340. The physical inventory for this warehouse is 10, but with this order the available quantity for this warehouse may be reduced to 9. The ordered product may be picked from BIN A 360 in the Default Warehouse 340 with no net change to the physical inventory of the Default Warehouse 340, because picking results in a transfer to the Picking BIN 370. Only when the ordered product ships from the Default Warehouse 340 does the reserved quantity go to zero and physical quantity goes down by one.

Note that some bin movement transactions (e.g., a bin transfer) may have no net effect on the total physical inventory in a warehouse (e.g., warehouse-level) nor on the available inventory shown by the system as sellable (e.g., aggregate-level). But a shipped order bin transaction both reduces a picking bin and also results in a lower physical inventory value in the warehouse. Also, because the order status is changed to shipped, the reserved quantity goes down. In the example scenario 300, after the order shipped, both the physical and the available inventory both reverted to 14. Conversely, a purchase order both fills some bin and results in an increased physical inventory value in a warehouse.

Bin-level data is not always available. For example, not all warehouses that are candidates to service sales orders are necessarily owned and/or managed by the same business. The industry recognizes a designation of a 'dropship warehouse' to indicate that a warehouse is not owned by the retailer, but instead is typically used for vendor feeds. For example, and without limitation, when an inventory valuation report is generated, one would only look at the warehouses that are not dropship warehouses (i.e., inventory in a dropship warehouse may, not be included in weighted average calculations for average cost). Bin-level visibility into a dropship warehouse may not be available to a retailer.

Some warehouses may have their inventory controlled down to a bin level while others only managed on a product warehouse-level. For example, and without limitation, if a warehouse is managed by the company themselves, the company may want to manage it on a bin-level as illustrated in FIG. 2A, which shows the three bins 220, 221, 222 of the Default Warehouse 210 as visible to the Aggregation Server 101. But if the company engages another warehouse that is a third-party warehouse (3PL), the Aggregation Server 101 may not have information available at a bin-level. Instead, the Aggregation Server 101 may only detect how much of a target product is in that 3PL warehouse. For example, and without limitation, FIG. 2A shows a total of 56 units available from the New York Warehouse 230. The system 100 advantageously allows these different types of warehouses to work together with respect to the aggregate quantities, irrespective of the warehouse type.

Bin inventory may be defined by the sum of movements after the last physical quantity of the bin (see FIG. 2A). Each bin movement may trigger reevaluation by the Warehouse Server 110 of the total inventory in the bin. Each time the bin value changes, reevaluation by the Warehouse Server 110 of actual product inventory (by SKU) for all bins in that warehouse is triggered. A change on the product warehouse-level may result, in turn, in a recalculation of the aggregate of all warehouses for the subject SKU using the Aggregation Server 110. Inventory may be reevaluated by looking at a quantity at a fixed point in time, called a 'Physical Inventory Date,' and then summing up the transactions after that date. For example, and without limitation, if a warehouse started with 0 units at the beginning of January and then received a purchase order for 10 units, and subsequently sold 1, the system 100 may perform the following calculation each time inventory was evaluated: 0+10−1=9. If the inventory was counted and the 'Physical Inventory Date' was reset to the time of the purchase order, the calculation may result in an evaluation of 10−1=9. The system 100 would not consider the transactions prior to the last physical inventory date. This technique may allow the user to backdate what the inventory value was on historical date and then reevaluate what inventory should be available currently based on the transactions that took place after that date.

For example, and without limitation, FIG. 3 illustrates that while the Warehouse Server 110 maintains physical inventory in the warehouses, the available inventory is also tracked in conjunction by the Aggregation Server 101. Available inventory may be reduced by reserved orders (as generated by one or more order sales channels) with no change to the physical inventory in the warehouse detected by the Warehouse Server 110. The transaction of the pending order going from the sales channel into the Aggregation Server 101 may trigger inventory to be reserved immediately. Once an order ships out, and the order has left the warehouse, that transaction may result in a change to the physical inventory as determined by the Warehouse Server 110. Each sales channel 140 may be configured in the Aggregation Server 101 to reserve inventory by default from a specific warehouse, but the physical inventory may be adjusted on the Warehouse Server 110 of the actual warehouse from which product is shipped. Once the order has been completed, the reserved quantity may disappear from the Aggregation Server 101.

The system 100 may similarly reduce available inventory (as opposed to physical inventory) for a manual reserve. As a matter of definition, a manual reserve is when a merchant sets aside inventory for a specific promotion or deal that has a fixed date range. When that date range expires, the remaining inventory may become available again for all sales channels. For example, and without limitation, if a merchant reserves 1000 units for a deal and, during that promotion period, 600 units sold with that deal, only 400 units would remain reserved on that deal. The reserve quantity may be dynamic and may take into account the amount of related orders that were completed. After the deal period, the remaining reserve on the 400 units may be lifted and may become available inventory again.

Just as reserved inventory may artificially reduce available inventory, the system 100 may support pre-sell inventory that is pending arrival to a warehouse from a purchase order (that is, the product is not physically available) to artificially inflate the available inventory values on the Aggregation Server 101. While inventory typically would increase only as a purchase order is received at a servicing warehouse(s), impacting both on the detected physical inventory and available inventory, marking units for pre-sell may allow the unreceived quantity to be available for sale through the Aggregation Server 101 with no impact on the physical inventory.

As described above, the system 100 may include a mobile app warehouse inventory tool 131 with order management for use by warehouse team members (referred to as "pickers") to pick orders based on real time data without walking around with paper picklists, and to log physical inventory changes to the Warehouse Server 110. As the order management data changes, the path of the picklist may adjust to account for changed requirements and results in maximum efficiency.

For example, and without limitation, a mobile device 130 may be used to log addition of physical inventory received as a result of a purchase order, and to communicate this physical inventory adjustment to the Warehouse Server 110. Also for example, and without limitation, the mobile device 130 may be used to log decrement of physical inventory as a result of shipment and/or transfer out, and to communicate this physical inventory adjustment to the Warehouse Server 110. As any number of mobile devices 130 log physical inventory movements that alter physical inventory, the Aggregation Server 101 may consider the new physical inventory values of all servicing warehouses and may consider reserved orders to evaluate an aggregate available inventory at any given point in time.

While tracking the physical inventory in the warehouse, the present invention may give real time instructions as to which products need to be picked from the bins to fulfill orders and may consider both the current order status and real time location of the product. While the warehouse team member is walking around the warehouse picking orders, existing orders may be cancelled or put on hold by the system 100. Such employment of real time data by the system 100 may advantageously allow the warehouse team member to not pick an order that is no longer actively in progress.

Referring now to FIGS. 4A, 4B, 4C, and 4D, exemplary system interfaces for warehouse management of purchase order receiving will now be discussed in detail.

Figures 4A, 4B:
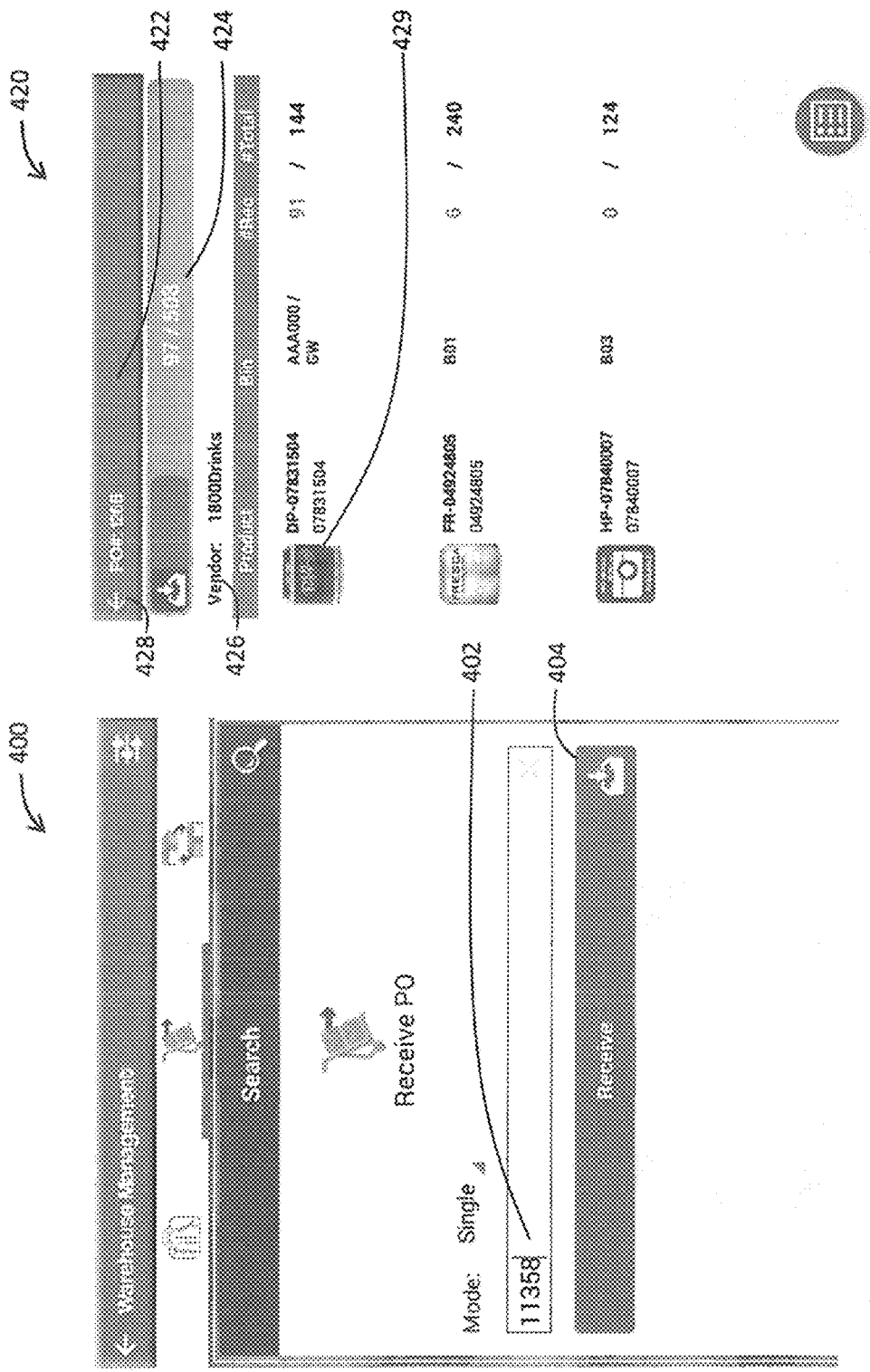
FIGS. 4A, 4B, 4C, and 4D are schematic representations of states of an exemplary user interface for product receipt processing using a multi-level IMS according to an embodiment of the present invention.

For example, and without limitation, FIG. 4A illustrates that to log receipt of incoming product related to a given purchase order (PO), a user may use a search page 400 to enter an identifier for the PO into a PO identifier field 402. Selecting a 'Receive' operation icon 404 may cause the system to retrieve a list of products on the subject PO 422, and to navigate to a display page for that list. For example, and without limitation, FIG. 4B illustrates a display page 420 that may list products on the specified PO 422 from the previous search page 400. The display page 420 may also display a progress indicator 424 and a vendor name 426 both associated with the specified PO 422. The display page 420 may also include a back icon 428 that may, when selected, allow a user to leave the present system module after saving any work related to PO receipt. After saving, the user may be returned to the search page 400 where the PO identifier 422 may be used to retrieve and manipulate the previously updated PO information.

Selecting a listed product 429 from the list on the display page 420 may cause the system 100 to navigate to a receive product dialog page for that product. For example, and without limitation, FIGS. 4C and 4D each illustrate a receive product dialog page that may allow entry of receipt parameters related to the selected product 429 from the previous display page 420. After all parameters are entered as described below, a Receive operator (448 in FIG. 4C, and 458 in FIG. 4D, respectively) may be activated to transmit these parameters as a call to the Aggregation Server 101. Upon receipt of acknowledgement from the Aggregation Server 101, the system 100 may update the listed product information displayed by the display page 420 to show, for example, and without limitation, the new quantity received and also the progress bar 424.

Figure 4D:
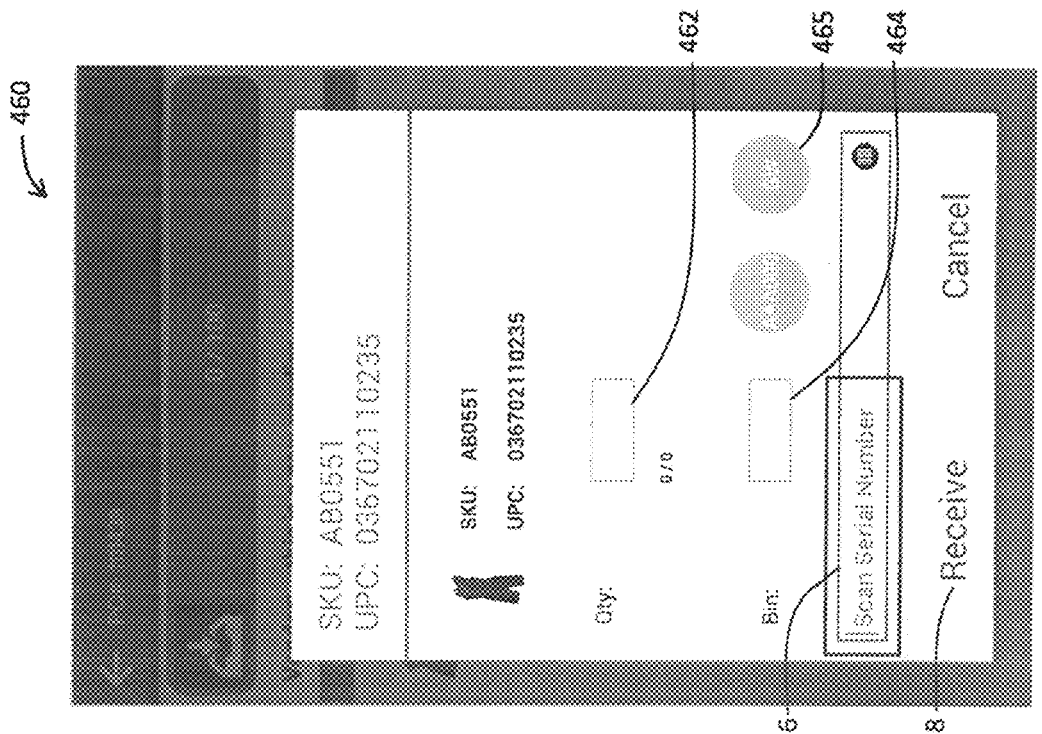
Figure 4C:
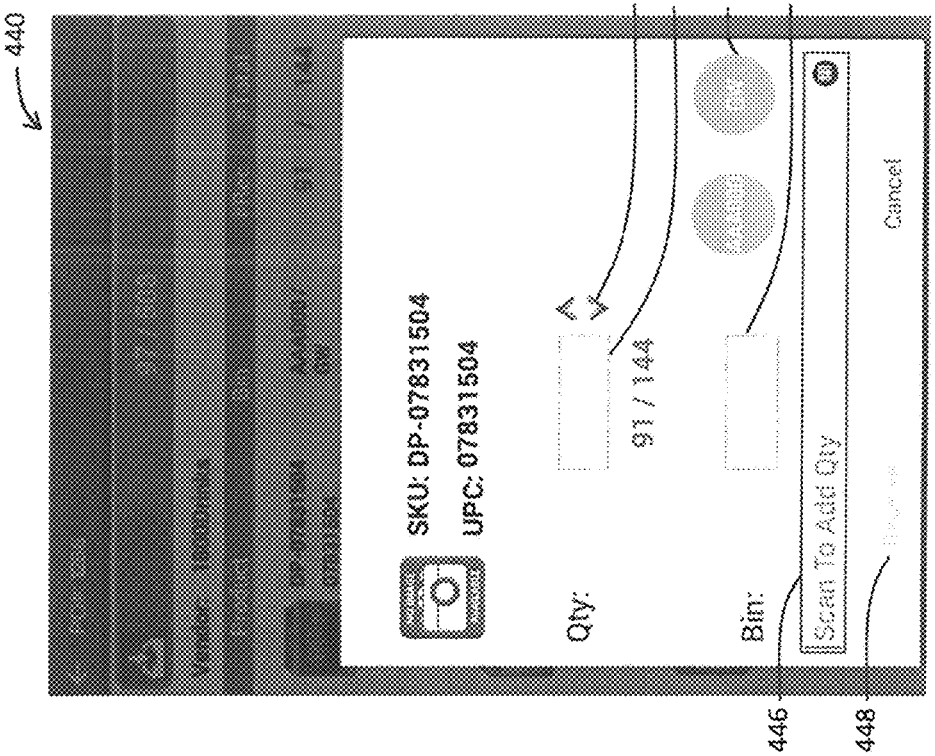

FIG. 4C shows a first exemplary receive product dialog page 440 to which the system 100 may navigate when the listed product selection 429 from the display page 420 does not require a serial scan of the incoming product. For example, and without limitation, the user may enter a value for the quantity (Qty) 442 of product received. The dialog page 440 may employ arrows 443 that a user may use to manipulate the Qty field 442. Optionally, a user may elect to scan 446 to add quantity to the Qty field 442.

Also for example, and without limitation, the user may enter a destination bin indicator 444 for the received product. In one embodiment, the user may select a bin suggestion bubble 445, which may cause the system 100 to automatically populate the bin indicator field 444 with the name of the selected bin, and which may cause the selected bin bubble to visually flag its selection (e.g., the selected bin bubble may change color). Alternatively, the user may directly enter a value into the bin indicator field 444, and that value may signify a different bin than any bins suggested using the bin bubbles 445. If the user enters a bin value that matches any of the bin suggestions displayed in the bin bubbles 445, the system may cause a change in color of the matching bubble to visually flag its selection.

FIG. 4D shows a second exemplary receive product dialog page 460 to which the system 100 may navigate when the listed product selection 429 from the display page 420 does require a serial scan of the incoming product. For example, and without limitation, the user may not be allowed to directly enter a value for the quantity (Qty) 462 of product received. Instead, the user may be required to scan serials for product 466 to add quantity to the Qty field 462. Each scan of a serial may increment the Qty field 462 by one (1). Each serial must be unique and must match the SKU/UPC of the product.

Similar to the operation of the first exemplary dialog page 440, the user of the second exemplary dialog page 460 may enter a destination bin indicator 464 for the received product. In one embodiment, the user may select a bin suggestion bubble 465, which may cause the system 100 to automatically populate the bin indicator field 464 with the name of the selected bin, and which may cause the selected bin bubble to visually flag its selection (e.g., the selected bin bubble may change color). Alternatively, the user may directly enter a value into the bin indicator field 464, and that value may signify a different bin than any bins suggested using the bin bubbles 465. If the user enters a bin value that matches any of the bin suggestions displayed in the bin bubbles 465, the system may cause a change in color of the matching bubble to visually flag its selection.

Referring now to FIGS. 5A, 5B, 5G, 5D, 5E, 5F, 5G, 5H, and 5J, exemplary system interfaces for warehouse management of product picklists will now be discussed in detail.

For example, and without limitation, FIG. 5A illustrates a picklist page 500 that may allow selection of product on hand 502 for picking in satisfaction of at least one sales order (SO). In one embodiment, a user may activate (e.g., click on) the pick selection 502 directly. In another embodiment, the user may engage the pick selection 502 by serial scan which identifies the target product. In yet another embodiment, the user may activate a Search operator 504 which may cause the system to navigate to a search picklist page 510 (as shown on FIG. 5B), where the user may search a given picklist for product by SKU/UPC 512. If the searched product does not exist in the subject picklist, then the system 100 may display an error to the user.

FIG. 5C shows an exemplary pick product dialog page 520 to which the system 100 may navigate when the pick selection 502 is made from one of the picklist page 500 and the search picklist page 510. For example, and without limitation, the user may enter a value for the quantity (Qty) 622 of product to pick. The user of the pick product dialog page 520 may enter a pick bin indicator 524 for the desired product, or may populate the pick bin indicator 524 by selecting a bin suggestion bubble 525. Selecting a 'Pick' operation icon 526 may cause the system 100 to process picking of the selected products in response to the subject sales order, as described in more detail below. However, the system 100 may be configured with additional functionality to adorn product records prior to picking.

In one embodiment, the pick product dialog page 520 may allow selection of a flag operation (as illustrated, a flag icon) 528, which may cause the system 100 to navigate to a product flags page 530 (as shown on FIG. 5D), where the user may enter and/or select a flag description 532, and/or may optionally enter an identifier for a bin 534 that is characterized by the flagged issue. The user may elect to add the information defining a flag 536 to a product, to remove a flag 538 from a product, and/or to close the product flags page 530 without adding a flag to a product.

In another embodiment, the pick product dialog page 520 may allow selection of a replacement operation (as illustrated, a swap icon) 529, which may cause the system to navigate to a replacements page 540 (as shown on FIG. 5E), where the user may select 542 a single replacement product description from among one or more replacement choices made available by the system 100 to the user. The system 100 may highlight the selected replacement for display on the replacements page 540. Alternatively, or in addition, the system 100 may allow the user to scan to select 544 a replacement product description. If the scan matches any in the list of replacement product choices, the system 100 may mimic the 'click action' and highlighting described above. To leave the replacements page 540, the user may elect to finish and save 546 the replacement product choice, and/or to cancel 549 without saving the replacement product. To subsequently remove a replacement product choice, a user may return to the replacements page 540 and unselect 542 the replacement product description.

Figure 5F:
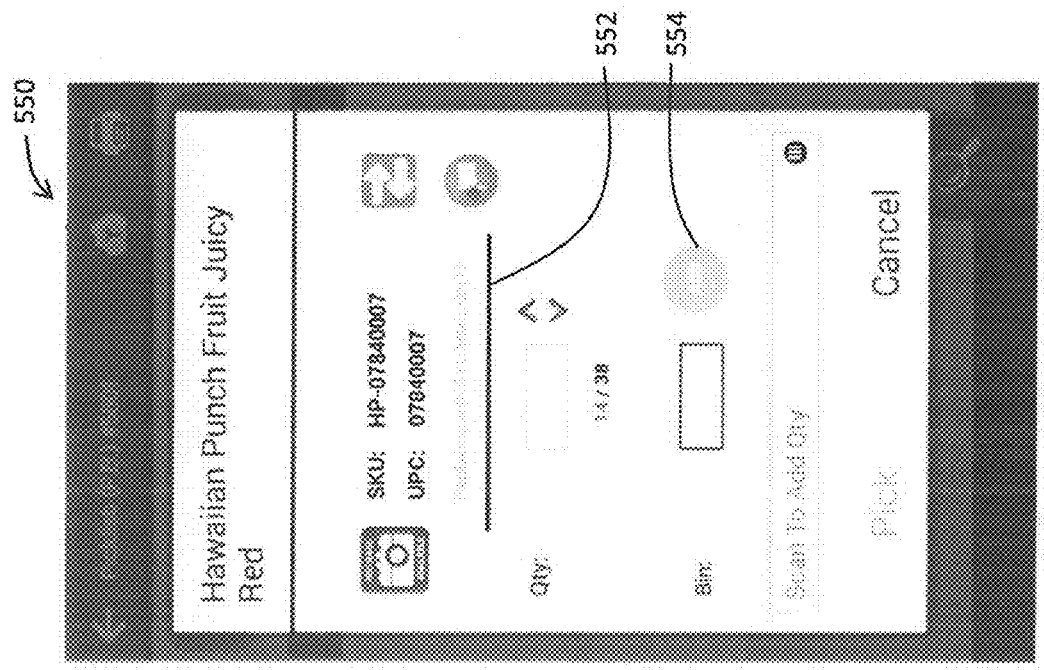
Figure 5E:
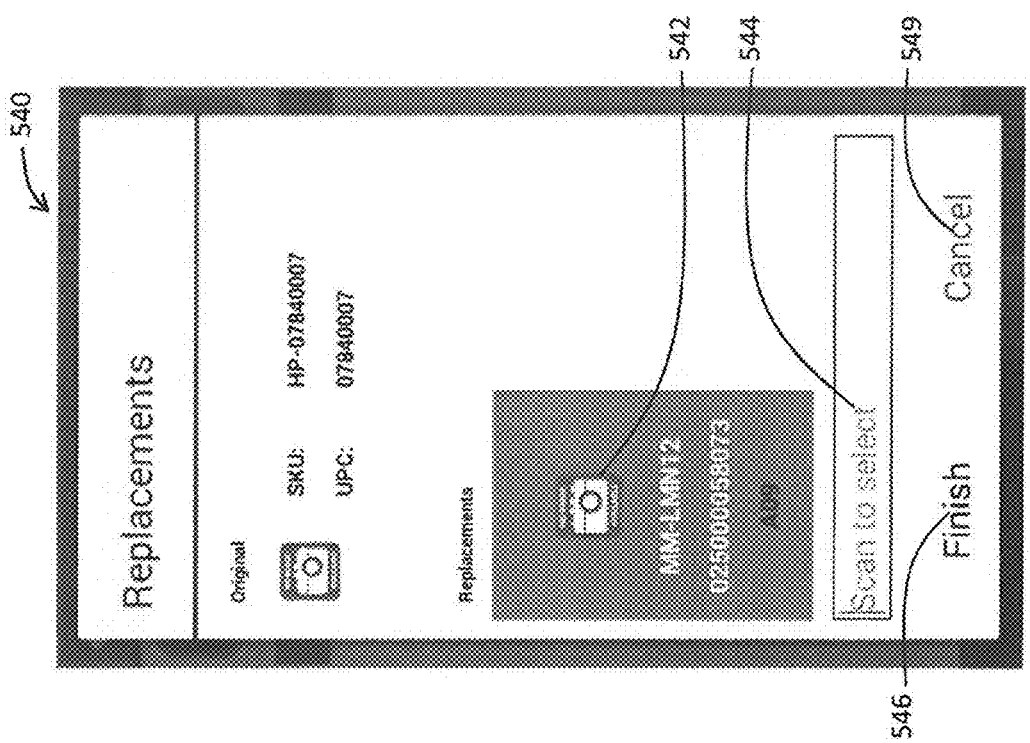

Saving replacement product parameters at the replacements page 540 may operate to modify the pick product dialog page 520 by swapping out the bin suggestions with new bins of the selected replacement, and/or showing a tooltip to indicate a replacement has been selected. For example, and without limitation, FIG. 5F illustrates a modified pick product dialog 550 characterized by a replacement SKU display 552 and also swapped out bin selections 554 with new bins selected for the replacement product.

Referring again to FIG. 5A, selecting the 'Pick' operator 526 may cause the system 100 to process picking of the selected products in response to the subject sales order. More specifically, the system 100 may compare the total quantity of product selected for picking to the quantity needed to satisfy all remaining sales orders. If the available quantity is sufficient, all pick parameters may be transmitted by the system 100 as a call to the Aggregation Server 101. Upon receipt of acknowledgement from the Aggregation Server 101, the system 100 may create an updated picklist page 560 that may include a notification of picked product units 562 (and associated progress bar update), and an updated quantity of picked product remaining on hand 564. In one embodiment, a flag icon 566 may be displayed by the system 100 to signify a newly added flagged condition for the product using the product flags page 530.

Figure 5H:
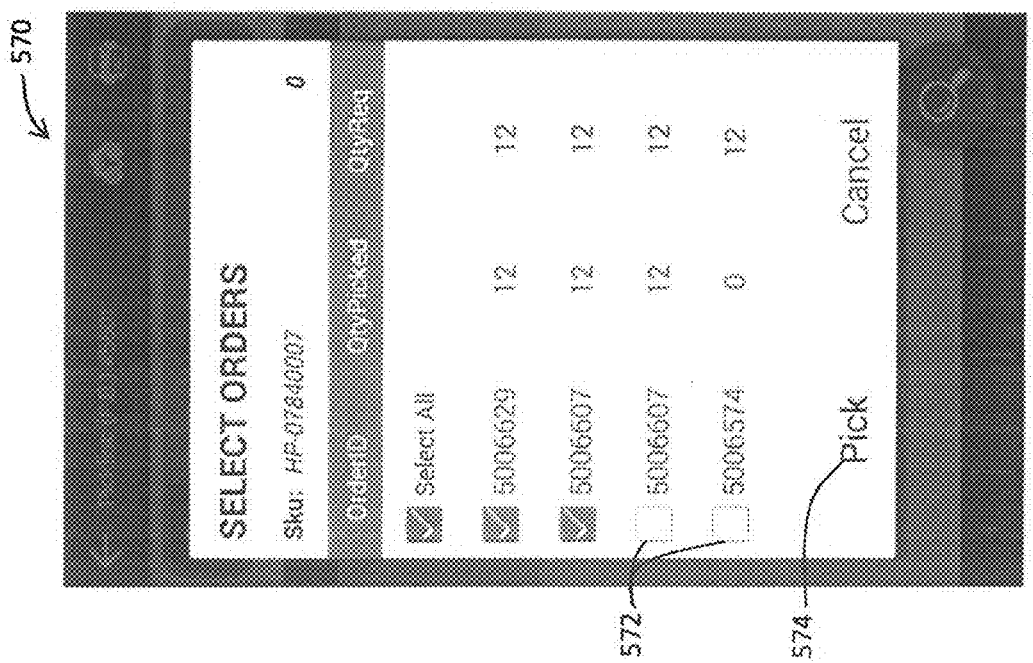
Figure 5G:
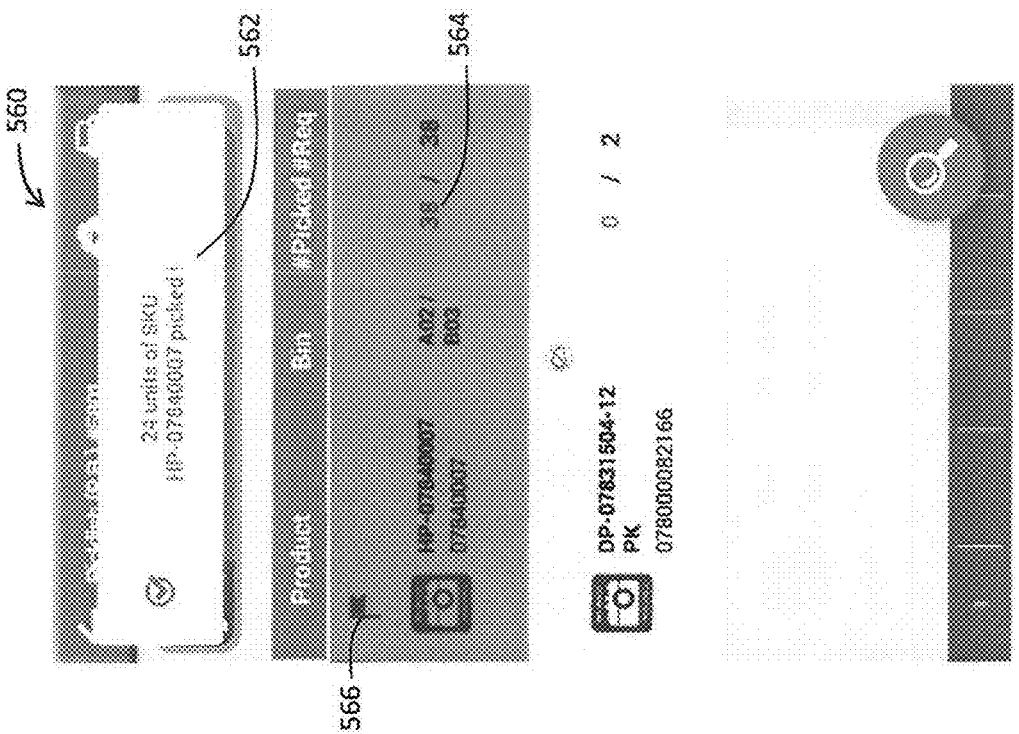
Figure 5J:
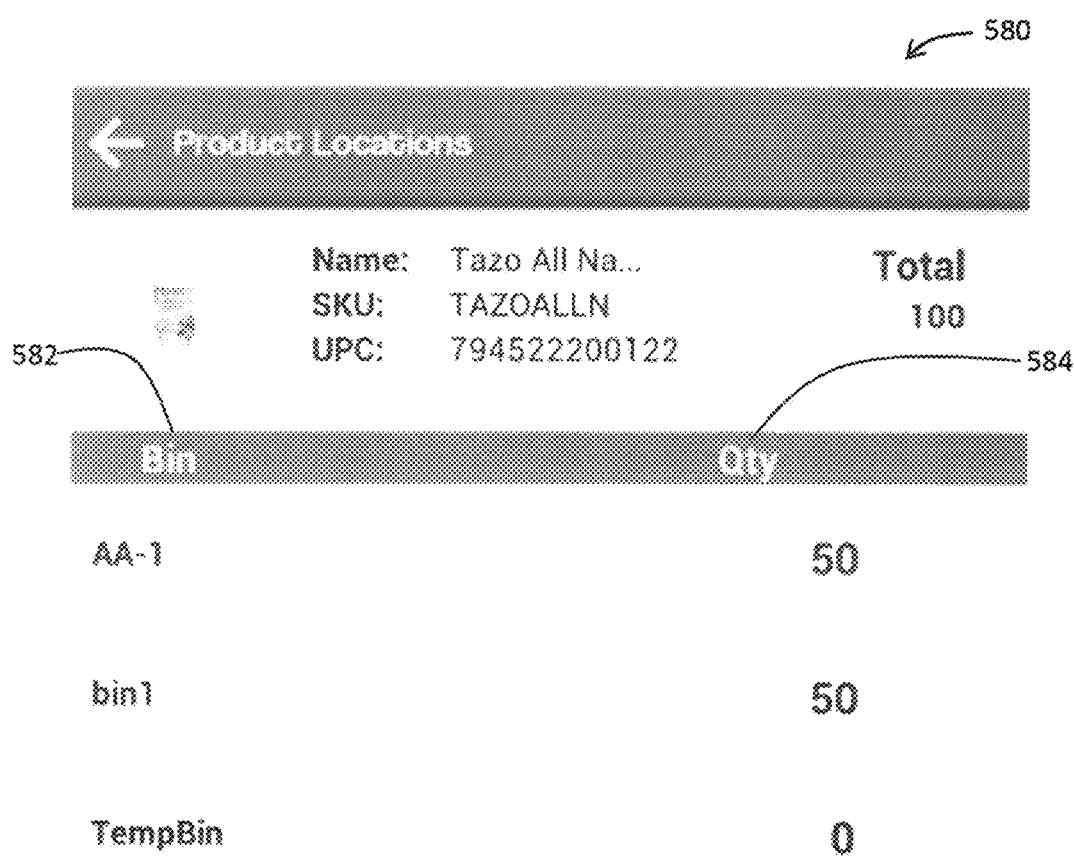

If the system's 100 comparison of the total picking quantity to the total sale quantity detects that the available quantity is insufficient, the system 100 may navigate to a select orders page 570 (as shown at FIG. 5H) that may allow a user to select orders to unpick 572 from those orders than already have been picked. The user may use a Pick operator 574 to transmit the paired down order selections as pick parameters to the system 100 as a call to the Aggregation Server 101, after which system may create an updated picklist page 560 as described above.

Referring again to FIG. 5A, the picklist page 500 may also include a filters operator 506 that may, when selected, display a picklist filters dialog page (not shown) that may allow the user to edit filters, save filters, and refresh the picklist with those selected filters. The picklist page 500 may also include a print operator 508 that may, when selected, display a list of orders fully picked (not shown) and allow a user to select the picked products for which the user wishes to print labels. The picklist page 500 may also include a product locator operator 509 that may, when selected, display a product bin location page 580 (shown at FIG. 5J) that may list, for example, and without limitation, each bin 582 occupied by a product of interest, and an associated quantity 584 of that product in each bin 582.

Referring now to FIGS. 6A, 6B, 6C, 6D, and 6E, exemplary system interfaces for warehouse management of bin inventory will now be discussed in detail.

Figures 6A, 6B:
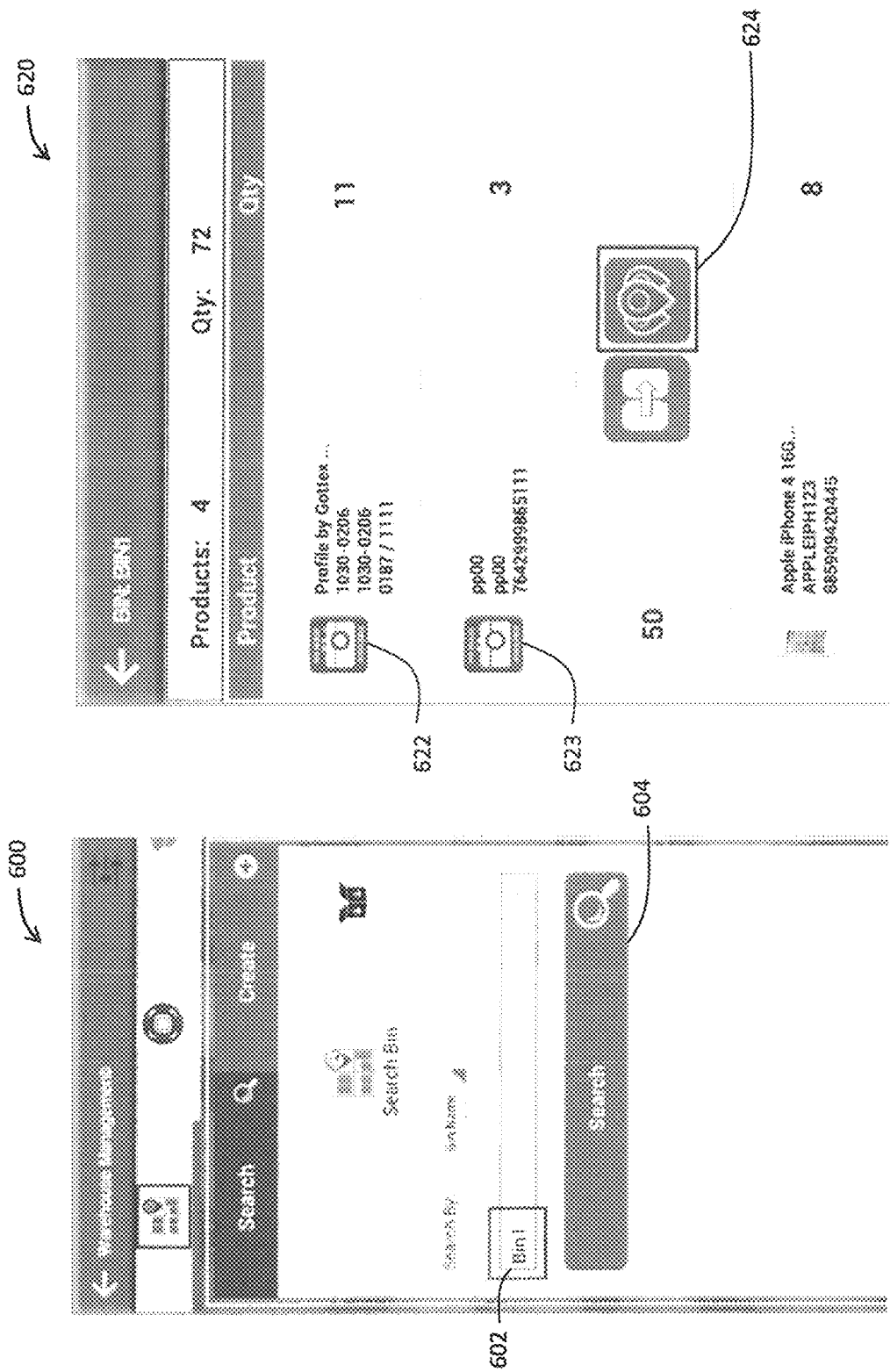
FIGS. 6A, 6B, 6C, 6D, and 6E are schematic representations of states of an exemplary user interface for product placement processing using a multi-level IMS according to an embodiment of the present invention.

For example, and without limitation, FIG. 6A illustrates a bin search page 600 that may allow a user to enter a bin identifier 602 for a bin of interest. Selecting a 'Search' operator 604 may cause the system 100 to retrieve a list of products present in the subject bin 602 at a given point in time, and to navigate to a display page for that list. For example, and without limitation, FIG. 6B illustrates a bin display page 620 that may list products 622, 623 to be found in the identified bin 602 from the previous search page 600, as well as total products and unit quantity for that bin 602.

Figure 6D:
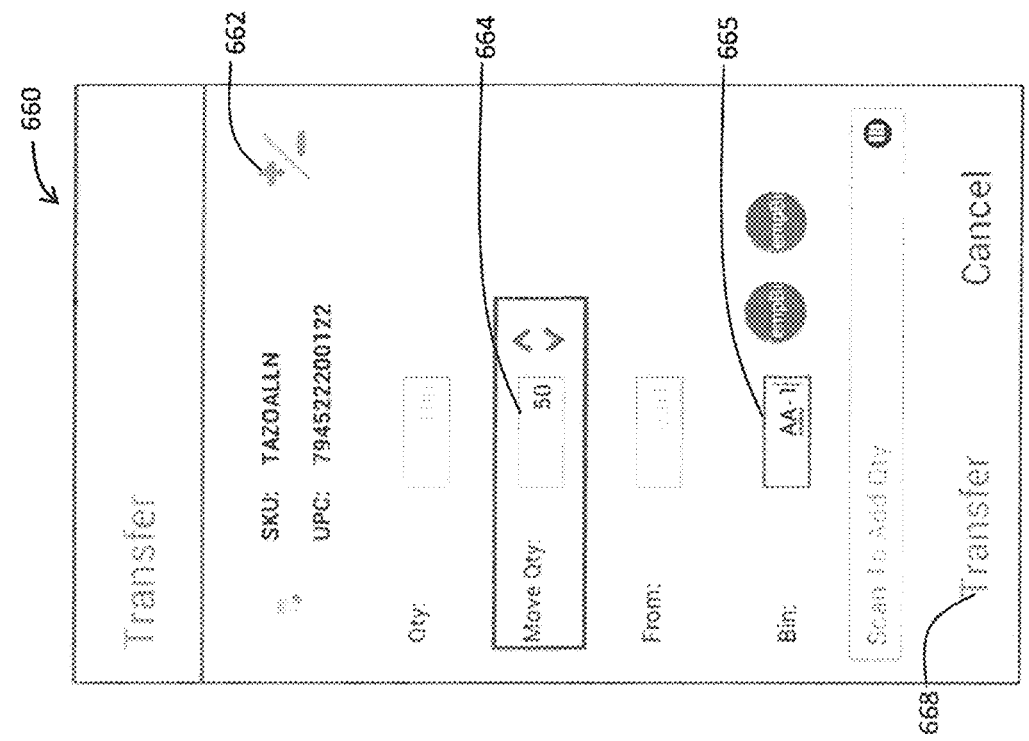
Figure 6C:
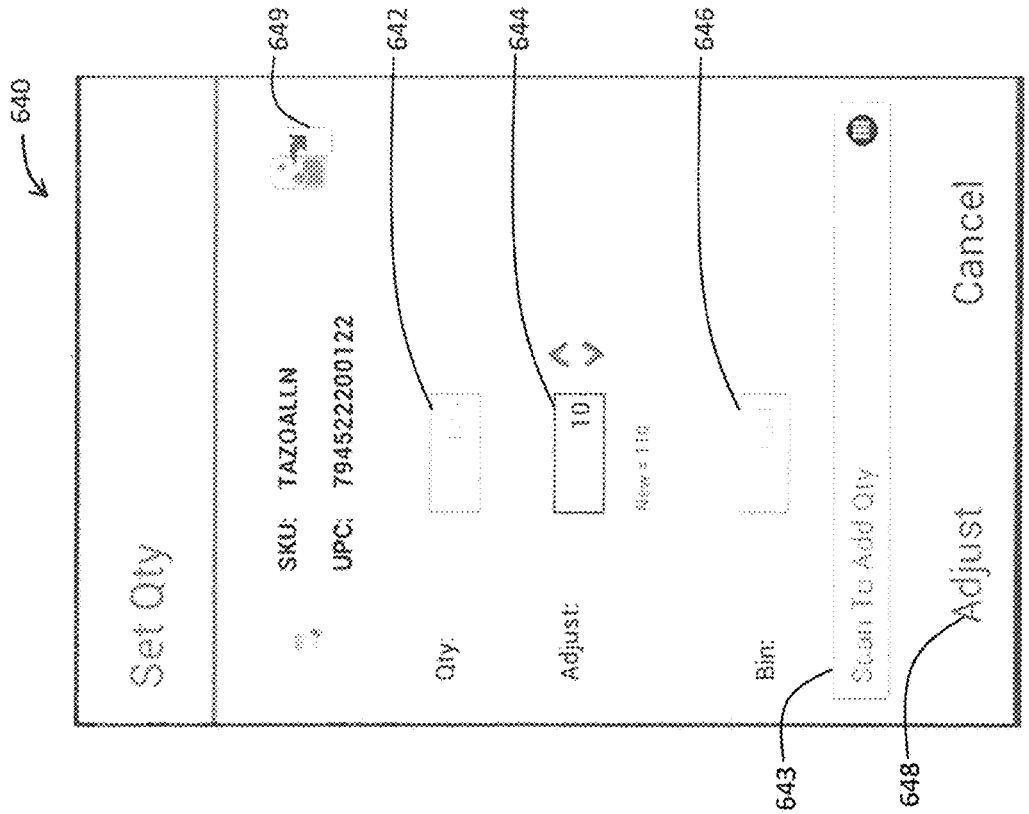
Figure 6E:

Selecting a listed product 622 from the list on the bin display page 620 may cause the system to navigate to a set quantity dialog page for a product of interest. For example, and without limitation, FIG. 6C illustrates a set quantity dialog page 640 that may allow entry of receipt parameters related to the selected product 622 from the previous bin display page 620. After all parameters are entered as described below, an Adjust operator (648 in FIG. 6C) may be activated to transmit these parameters as a call to the Aggregation Server 101. Upon receipt of acknowledgement from the Aggregation Server 101, the system 100 may update the listed product information displayed by the bin display page 620 to show, for example, and without limitation, the adjusted product quantity.

In one embodiment, the set quantity dialog page 640 may display a view/read only current quantity field 642, and also a view/read only bin identifier field 646. The set quantity dialog page 640 may support an interactive quantity adjust field 644 that a user may employ to enter an adjustment value (positive or negative) to be communicated to the Aggregation Server 101 as a bin parameter adjustment. Alternatively, the system may allow a user to scan to add quantity 646 to the quantity adjust field 644.

In another embodiment, the set quantity dialog page 640 may also include a transfer operator 649 that may, when selected, display a transfer product dialog page. For example, and without limitation, FIG. 6D illustrates a transfer product dialog page 660 that may allow entry of move parameters related to move a quantity of selected product 664 from a known bin to an alternative bin 665. After all move parameters are entered, a Transfer operator (668 in FIG. 6D) may de activated to instruct the system 100 to update the set quantity information displayed by the set quantity display page 640.

Referring again to FIG. 6B, the bin display page 620 may also include a bin locator operator 624 for a product of interest that may, when selected, display a bin location page 680 (shown at FIG. 6E) listing, for example, and without limitation, all bins within which the product of interest is located, as well as a quantity of the product present in each bin in the list. In one embodiment, the bin display page 620 may include a transfer operator 682 that, like transfer operator 649 above, may, when selected, may convey functional control to the transfer product dialog page 660. In another embodiment, the bin display page 620 may include a return operator 684 that may, when selected, return functional control to the calling bin display page 620.

Figure 7:
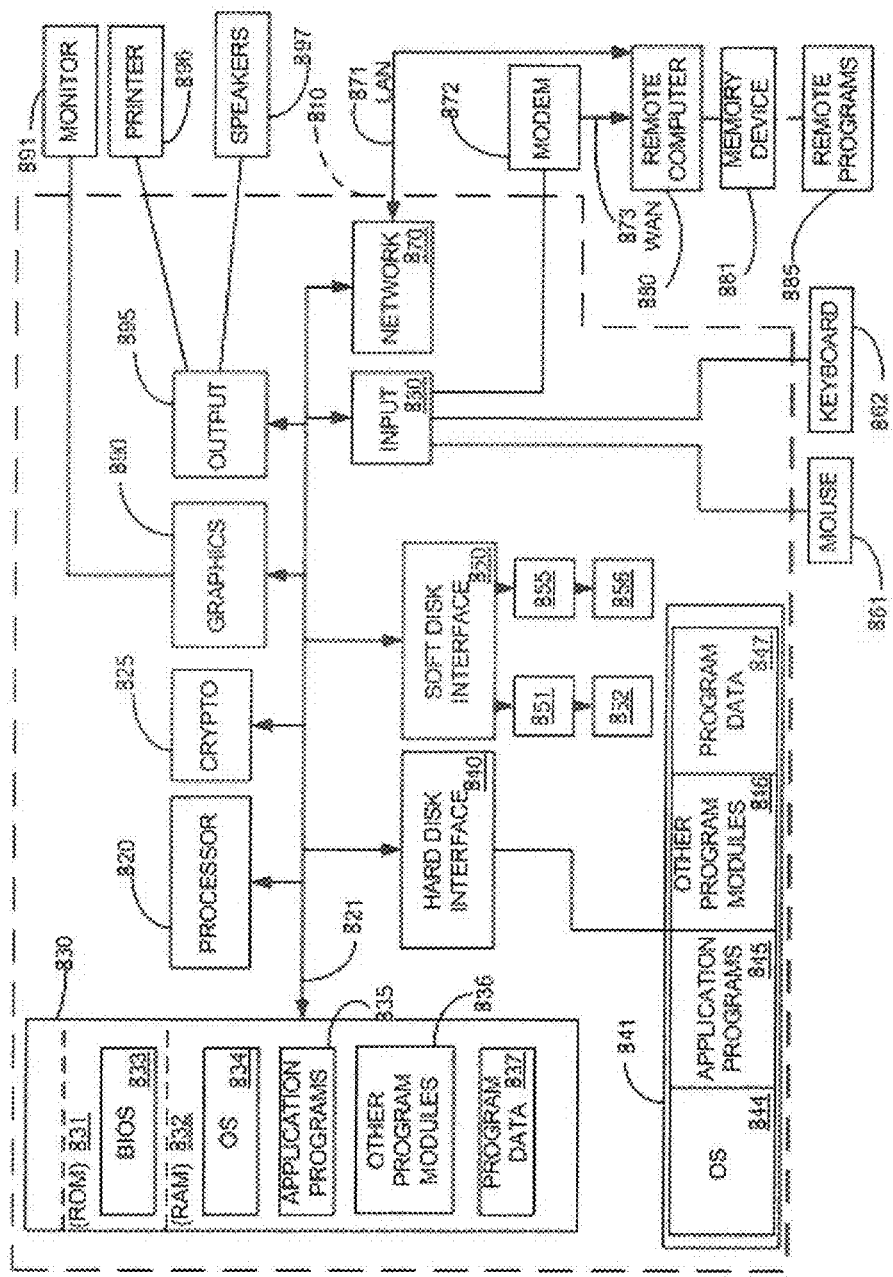
FIG. 7 is a block diagram representation of a machine in the example form of a computer system according to an embodiment of the present invention.

A skilled artisan will note that one or more of the aspects of the present invention may be performed on a computing device. The skilled artisan will also note that a computing device may be understood to be any device having a processor, memory unit, input, and output. This may include, but is not intended to be limited to, cellular phones, smart phones, tablet computers, laptop computers, desktop computers, personal digital assistants, etc. FIG. 7 illustrates a model computing device in the form of a computer 810 which is capable of performing one or more computer-implemented steps in practicing the method aspects of the present invention. Components of the computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI).

The computer 810 may also include a cryptographic unit 825. Briefly, the cryptographic unit 825 has a calculation function that may be used to verify digital signatures, calculate hashes, digitally sign hash values, and encrypt or decrypt data. The cryptographic unit 825 may also have a protected memory for storing keys and other secret data. In other embodiments, the functions of the cryptographic unit may be instantiated in software and run via the operating system.

A computer 810 typically includes a variety of computer readable media. Computer readable media can be any available media that can be accessed by a computer 810 and includes both volatile and nonvolatile media, removable and non-removable media. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being, operated on by processing unit 820. By way of example, and not limitation, FIG. 7 illustrates an operating system (OS) 834, application programs 835, other program modules 836, and program data 837.

The computer 810 may also include other removable/non-removable, volatile/nonvolatile computer storage media. By way of example only. FIG. 7 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically, connected to the system bus 821 through a non-removable memory interface such as interface 840, and magnetic disk drive 851 and optical disk drive 855 are typically connected to the system bus 821 by a removable memory interface, such as interface 850.

The drives, and their associated computer storage media discussed above and illustrated in FIG. 7, provide storage of computer readable instructions, data structures, program modules and other data for the computer 810. In FIG. 7, for example, hard disk drive 841 is illustrated as storing an OS 844, application programs 845, other program modules 846, and program data 847. Note that these components can either be the same as or different from OS 833, application programs 833, other program modules 836, and program data 837. The OS 844, application programs 845, other program modules 846, and program data 847 are given different numbers here to illustrate that, at a minimum, they may be different copies. A user may enter commands and information into the computer 810 through input devices such as a keyboard 862 and cursor control device 861, commonly ref rued to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a graphics controller 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 7. The logical connections depicted in FIG. 7 include a local area network (LAN) 871 and a wide area network (WAN) 873, but may also include other networks 140. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 7 illustrates remote application programs 885 as residing on memory device 881.

The communications connections 870 and 872 allow the device to communicate with other devices. The communications connections 870 and 872 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Those skilled in the art will appreciate that the present invention contemplates the use of data structures that may store information supporting any or all of the operations involved in inventory management. The disclosure of the exemplary data structures above is not meant to be limiting in any way. Those skilled in the art will readily appreciate that data structures may include any number of additional or alternative real world data sources, and may be configured, in any way while still accomplishing the many goals, features and advantages according to the present invention.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A method of operating a multi-level inventory tracking system comprising at least one computer processor and at least one non-transitory computer-readable storage medium characterized by a plurality of instructions which, when executed by the at least one computer processor, perform the method comprising:
    creating at least one bin-level record each comprising a respective bin-level inventory, defined as a bin-level count characterized by a physical inventory type and associated with a bin-level SKU;
    creating at least one warehouse-level record each comprising a respective warehouse-level inventory, defined as a warehouse-level count characterized by the physical inventory type and associated with a warehouse-level SKU configured to reference the bin-level SKU; and
    creating at least one aggregate-level record comprising an aggregate-level inventory, defined as an aggregate-level count characterized by an available inventory type and associated with an aggregate-level SKU configured to reference the warehouse-level SKU.

2. The method according to claim 1 further comprising the steps of:
    receiving a sales order associated with the aggregate-level SKU of the at least one aggregate-level record and comprising a reserve order quantity, and
    decrementing the aggregate-level inventory of the at least one aggregate-level record by the reserve order quantity.

3. The method according to claim 1 further comprising the steps of:
    receiving a reserve order associated with the aggregate-level SKU of the at least one aggregate-level record and comprising a reserve order quantity, and decrementing the aggregate-level inventory of the at least one aggregate-level record by the reserve order quantity.

4. The method according to claim 1 further comprising the steps of:
receiving a shipping order associated with the bin-level SKU of the at least one bin-level record and comprising a shipping order quantity, and
decrementing by the shipping order quantity each of the reserve order quantity, the bin-level inventory of the at least one bin-level record, and the warehouse-level inventory of the at least one warehouse-level record associated with the bin-level SKU of the at least one bin-level record.

5. The method according to claim 1 further comprising the steps of:
receiving a purchase order associated with the bin-level SKU of the at least one in-level record and comprising a purchase order quantity, and
incrementing by the purchase order quantity both the bin-level inventory of the at least one bin-level record and the warehouse-level inventory of the at least one warehouse-level record associated with the bin-level SKU of the at least one bin-level record.

6. The method according to claim 1 further comprising the steps of:
receiving a pre-sell order associated with the aggregate-level SKU of the at least one aggregate-level record and comprising a pre-sell order quantity, and
incrementing the aggregate-level inventory of the at least one aggregate-level record by the pre-sell order quantity.

7. The method according to claim 1 further comprising the steps of:
receiving a dropship marking associated with the at least one warehouse-level record, and
incrementing the aggregate-level inventory of the at least one aggregate-level record by the respective warehouse-level inventory of each of the at least one warehouse-level record.

8. The method according to claim 1 further comprising the steps of:
receiving an unsellable marking associated with the at least one warehouse-level record, and
decrementing the aggregate-level inventory of the at least one aggregate-level record by the respective warehouse-level inventory of each of the at least one warehouse-level record.

9. The method a according to claim 1 further comprising the steps of:
receiving a sellable marking associated with the at least one warehouse-level record, and
incrementing the aggregate-level inventory of the at least one aggregate-level record by the respective warehouse-level inventory of each of the at least one warehouse-level record.

10. The method according to claim 1 further comprising the steps of:
receiving a bin transfer order associated with the bin-level SKU of the least one bin-level record and comprising a bin transfer order quantity, and
decrementing the bin-level inventory of the at least one bin-level record by the bin transfer order quantity.

11. A computer system comprising a peripheral device, a Warehouse Server, an Aggregation Server, and a Sales Channel Server, each characterized by a respective computer processor and by a respective non-transitory computer-readable storage medium each comprising a plurality of instructions;
wherein the Warehouse Server is operable to create at least one bin-level record each comprising a respective bin-level inventory, defined as a bin-level count characterized by a physical inventory type and associated with a bin-level SKU;
wherein the Warehouse Server is operable to create at least one warehouse-level record each comprising a respective warehouse-level inventory, defined as a warehouse-level count characterized by the physical inventory type and associated with a warehouse-level SKU configured to reference the bin-level SKU; and
wherein the Aggregation Server is operable to create at least one aggregate-level record each comprising an aggregate-level inventory, defined as an aggregate-level count characterized by an available inventory type and associated with an aggregate-level SKU configured to reference the warehouse-level SKU.

12. The computer system according to claim 11 wherein the Aggregation Server is operable to receive from the Sales Channel Server a sales order associated with the aggregate-level SKU of the at least one aggregate-level record and comprising a reserve order quantity, and to decrement the aggregate-level inventory of the at least one aggregate-level record by the reserve order quantity.

13. The computer system according to claim 11 wherein the Aggregation Server is operable to receive a reserve order associated with the aggregate-level SKU of the at least one aggregate-level record and comprising a reserve order quantity, and to decrement the aggregate-level inventory of the at least one aggregate-level record by the reserve order quantity.

14. The computer system according to claim 11 wherein the Warehouse Server is operable to receive from the peripheral device a shipping order associated with the bin-level SKU of the at least one bin-level record and comprising a shipping order quantity, and to decrement by the shipping order quantity each of the reserve order quantity, the bin-level inventory of the at least one bin-level record, and the warehouse-level inventory of the at least one warehouse-level record associated with the bin-level SKU of the at least one bin-level record.

15. The computer system according to claim 11 wherein the Warehouse Server is operable to receive a purchase order associated with the bin-level SKU of the at least one bin-level record and comprising a purchase order quantity, and to increment by the purchase order quantity both the bin-level inventory of the at least one bin-level record and the warehouse-level inventory of the at least one warehouse-level record associated with the bin-level SKU of the at least one bin-level record.

16. The computer system according to claim 11 wherein the Aggregation Server is operable to receive a pre-sell order associated with the aggregate-level SKU of the at least one aggregate-level record and comprising a pre-sell order quantity, and to increment the aggregate-level inventory of the at least one aggregate-level record by the pre-sell order quantity.

17. The computer system according to claim 11 wherein the Aggregation Server is operable to receive a dropship marking associated with the at least one warehouse-level record, and to increment the aggregate-level inventory of the at least one aggregate-level record by the respective warehouse-level inventory of each of the at least one warehouse-level record.

18. The computer system according to claim 11 wherein the Aggregation Server is operable to receive an unsellable marking associated with the at least one warehouse-level record, and to decrement the aggregate-level inventory of the at least one aggregate-level record by the respective warehouse-level inventory of each of the at least one warehouse-level record.

19. The computer system according to claim 11 wherein the Aggregation Server is operable to receive a sellable marking associated with the at least one warehouse-level record, and to increment the aggregate-level inventory of the at least one aggregate-level record by the respective warehouse-level inventory of each of the at least one warehouse-level record.

20. The computer system according to claim 11 wherein the Warehouse Server is operable to receive from the peripheral device a bin transfer order associated with the bin-level SKU of the at least one bin-level record and comprising a bin transfer order quantity, and to decrement the bin-level inventory of the at least one bin-level record by the bin transfer order quantity.

* * * * *